US012157315B2

(12) United States Patent
Shimomura et al.

(10) Patent No.: US 12,157,315 B2
(45) Date of Patent: Dec. 3, 2024

(54) RECORDING APPARATUS

(71) Applicant: SEIKO EPSON CORPORATION, Tokyo (JP)

(72) Inventors: Masaki Shimomura, Matsumoto (JP); Takuto Tanaka, Shiojiri (JP); Takeshi Aoki, Matsumoto (JP); Yusaku Amano, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/821,625

(22) Filed: Aug. 23, 2022

(65) Prior Publication Data

US 2022/0402270 A1 Dec. 22, 2022

Related U.S. Application Data

(63) Continuation of application No. 17/160,456, filed on Jan. 28, 2021, now Pat. No. 11,458,733.

(30) Foreign Application Priority Data

Jan. 31, 2020 (JP) ................................ 2020-014628

(51) Int. Cl.
*B41J 2/165* (2006.01)
*B41J 2/155* (2006.01)

(52) U.S. Cl.
CPC ....... *B41J 2/16508* (2013.01); *B41J 2/16505* (2013.01); *B41J 2/16511* (2013.01); *B41J 2/16538* (2013.01); *B41J 2/155* (2013.01)

(58) Field of Classification Search
CPC ............... B41J 2/16508; B41J 2/16505; B41J 2/16511; B41J 2/16538; B41J 2/155
See application file for complete search history.

(56) References Cited

U.S. PATENT DOCUMENTS

| | | | | |
|---|---|---|---|---|
| 6,502,922 | B2 | 1/2003 | Kawase et al. | |
| 7,735,958 | B2 | 6/2010 | Murayama | |
| 8,136,916 | B2 | 3/2012 | Nemoto et al. | |
| 8,398,193 | B2 | 3/2013 | Izawa et al. | |
| 8,585,176 | B2 | 11/2013 | Iwasa et al. | |
| 10,369,798 | B2 * | 8/2019 | Mori .................... | B41J 2/16588 |
| 10,406,838 | B2 | 9/2019 | Ohashi et al. | |

(Continued)

FOREIGN PATENT DOCUMENTS

| | | |
|---|---|---|
| CN | 103009829 | 4/2013 |
| JP | H07-246714 | 9/1995 |

(Continued)

*Primary Examiner* — Geoffrey S Mruk
(74) *Attorney, Agent, or Firm* — WORKMAN NYDEGGER

(57) ABSTRACT

A printer includes a line head, a transport unit, a head moving unit, a maintenance unit, a lid unit, and a rotation mechanism portion. The head moving unit moves the line head to a retreat position and a recording position along a B direction. The maintenance unit includes a cap portion configured to cover the nozzles, is formed with an opening, and is movable in a transport direction of a medium. A lid unit is rotatable about a rotation axis, and closes the opening in a closed posture. When the head moving unit moves the line head from the recording position to the retreat position, the rotation mechanism portion rotates the lid unit so that a posture of the lid unit becomes the closed posture.

18 Claims, 32 Drawing Sheets

(56) References Cited

U.S. PATENT DOCUMENTS

| | | | |
|---|---|---|---|
| 10,792,913 | B2 | 10/2020 | Kohnotoh |
| 10,864,747 | B2 | 12/2020 | Nakagawa et al. |
| 10,974,527 | B2 | 4/2021 | Ohashi et al. |
| 11,052,663 | B2 | 7/2021 | Muromachi et al. |
| 11,458,733 | B2 * | 10/2022 | Shimomura ......... B41J 2/16511 |
| 11,485,140 | B2 | 11/2022 | Aoki et al. |
| 2001/0038401 | A1 | 11/2001 | Kawase et al. |
| 2004/0021727 | A1 | 2/2004 | Hirai |
| 2008/0012896 | A1 | 1/2008 | Murayama |
| 2009/0073213 | A1 | 3/2009 | Iwata |
| 2012/0019577 | A1 | 1/2012 | Izawa et al. |
| 2012/0113180 | A1 | 5/2012 | Tanaka et al. |
| 2013/0076831 | A1 | 3/2013 | Ishida et al. |
| 2013/0127949 | A1 | 5/2013 | Ishida |
| 2014/0078231 | A1 | 3/2014 | Ito et al. |
| 2015/0274477 | A1 | 10/2015 | Kodama |
| 2016/0067972 | A1 | 3/2016 | Tanjo |
| 2018/0236797 | A1 | 8/2018 | Ohashi et al. |
| 2019/0111703 | A1 | 4/2019 | Nakagawa et al. |
| 2019/0299596 | A1 | 10/2019 | Kohnotoh |
| 2020/0016911 | A1 | 1/2020 | Ohashi et al. |
| 2020/0122470 | A1 | 4/2020 | Muromachi et al. |
| 2021/0178765 | A1 | 6/2021 | Tanaka |
| 2021/0237447 | A1 | 8/2021 | Shimomura et al. |
| 2021/0237452 | A1 | 8/2021 | Shimomura et al. |
| 2022/0402270 | A1 | 12/2022 | Shimomura et al. |

FOREIGN PATENT DOCUMENTS

| | | | |
|---|---|---|---|
| JP | 2004-042537 | | 2/2004 |
| JP | 2004-160801 | A | 6/2004 |
| JP | 2006-159528 | | 6/2006 |
| JP | 2006-219235 | | 8/2006 |
| JP | 2007-130808 | A | 5/2007 |
| JP | 2007-130809 | A | 5/2007 |
| JP | 2008-168528 | | 7/2008 |
| JP | 2009-072925 | | 4/2009 |
| JP | 2010-194950 | | 9/2010 |
| JP | 2010-194950 | A | 9/2010 |
| JP | 2010-214780 | A | 9/2010 |
| JP | 2011-073154 | A | 4/2011 |
| JP | 2012-025054 | | 2/2012 |
| JP | 2013-107272 | | 6/2013 |
| JP | 2016-155364 | | 9/2016 |
| JP | 2016-155364 | A | 9/2016 |
| JP | 2018-130960 | | 8/2018 |
| JP | 2019-073011 | | 5/2019 |
| JP | 2019-081659 | | 5/2019 |
| JP | 2019-166762 | A | 10/2019 |
| JP | 2019-171794 | | 10/2019 |
| JP | 2020-011522 | | 1/2020 |
| JP | 2020-026071 | | 2/2020 |
| JP | 2020-062816 | | 4/2020 |
| JP | 2021-121478 | | 8/2021 |

* cited by examiner

RECORDING APPARATUS

The present application is a continuation of U.S. patent application Ser. No. 17/160,456, filed Jan. 28, 2021, which is based on, and claims priority from JP Application Serial Number 2020-014628, filed Jan. 31, 2020, the disclosure of which is hereby incorporated by reference herein in its entirety.

BACKGROUND

1. Technical Field

The present disclosure relates to a recording apparatus.

2. Related Art

An image forming apparatus described in JP-A-2010-214780 has a printing portion in which a plurality of recording heads is configured to be arranged in lines and that is movable in an up-down direction, and a maintenance apparatus that is movable in a transport direction of a recording medium.

A printer apparatus described in JP-A-2010-194950 has a suction cap portion that performs suction during standby of a recording head, and a lid portion that is moved in one direction to cover the suction cap portion.

When the maintenance apparatus described in JP-A-2010-214780 is configured to be covered with the lid portion configured to slide and described in JP-A-2010-194950, it is necessary to secure a region for sliding the lid portion, and a recording apparatus may increase in size in a sliding direction of the lid portion.

SUMMARY

In order to solve the above problem, a recording apparatus according to the present disclosure includes a recording portion configured to eject liquid from an ejecting portion to perform recording on a medium, a support portion disposed so as to face the recording portion and configured to support the medium, a moving mechanism portion configured to move the recording portion to a recording position at which recording is performed on the medium and a retreat position farther away from the support portion than the recording position along a moving direction in which the recording portion advances or retreats with respect to the support portion, a cap unit that includes a cap portion configured to cover the ejecting portion when the recording portion is located at the retreat position, that is formed with an opening that opens on a side of the recording portion, and that is configured to move in a transport direction of the medium, a lid portion configured to rotate about a rotation axis extending in a width direction intersecting both the moving direction and the transport direction and configured to close the opening in a closed posture, and a rotation mechanism portion configured to rotate the lid portion so that a posture of the lid portion becomes the closed posture when the moving mechanism portion moves the record portion from the recording position to the retreat position.

DESCRIPTION OF EXEMPLARY EMBODIMENTS

Figure 1:
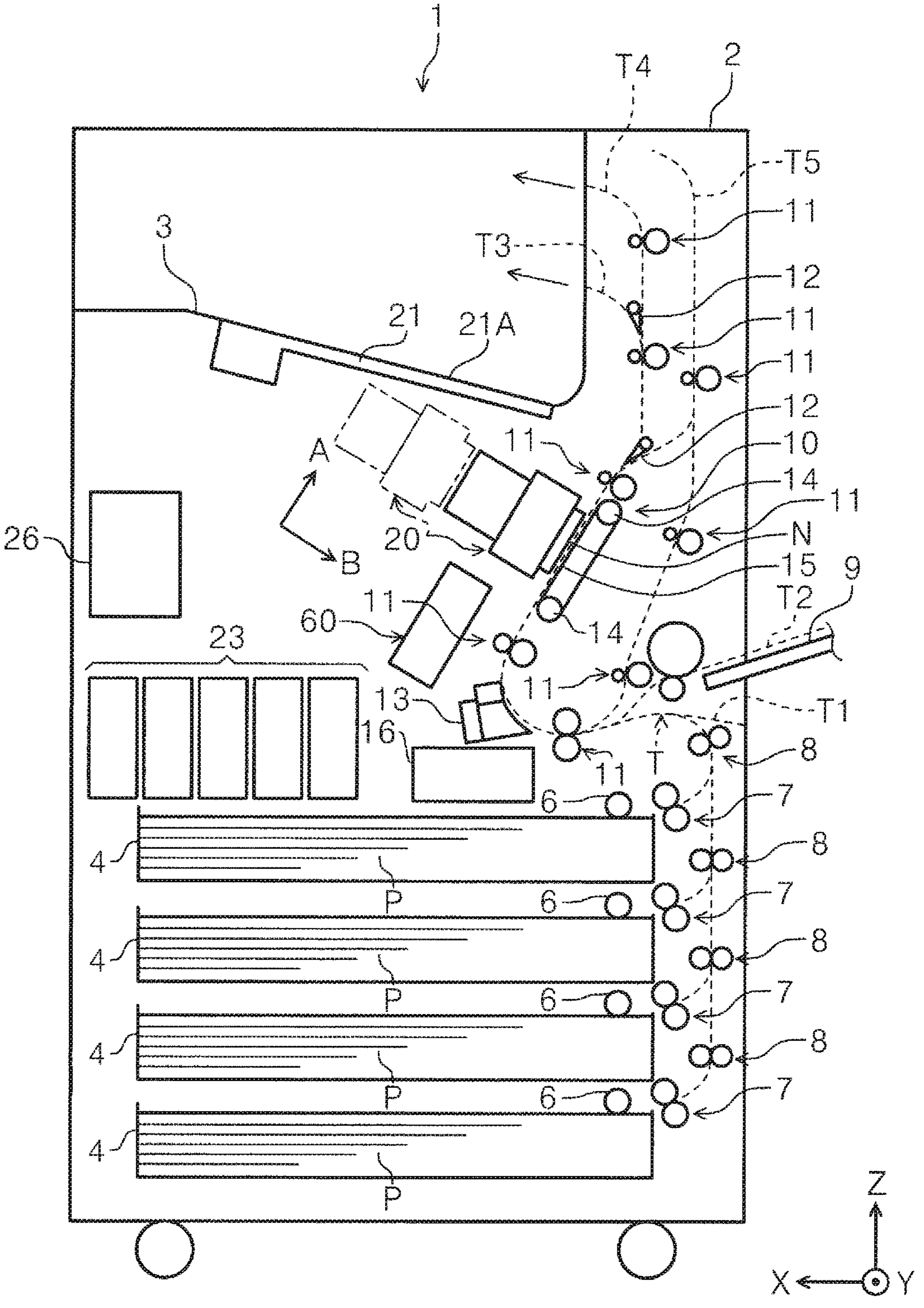
FIG. 1 is a diagram illustrating a transport path of a medium of a printer according to Embodiment 1.

Hereinafter, the present disclosure will be schematically described.

A recording apparatus according to a first aspect includes a recording portion configured to eject liquid from an ejecting portion to perform recording on a medium, a support unit disposed so as to face the recording portion and configured to support the medium, a moving mechanism portion configured to move the recording portion to a recording position at which recording is performed on the medium and a retreat position farther away from the support portion than the recording position along a moving direction in which the recording portion advances or retreats with respect to the support portion, a cap unit that includes a cap portion configured to cover the ejecting portion when the recording portion is located at the retreat position, that is formed with an opening that opens on a side of the recording portion, and that is configured to move in a transport direction of the medium, a lid portion configured to rotate about a rotation axis extending in a width direction intersecting both the moving direction and the transport direction and configured to close the opening in a closed posture, and a rotation mechanism portion configured to rotate the lid portion so that a posture of the lid portion becomes the closed posture when the moving mechanism portion moves the recording position from the recording position to the retreat position.

According to this aspect, when the moving mechanism portion moves the recording portion from the recording position to the retreat position, the rotation mechanism portion rotates the lid portion so that the posture of the lid portion becomes the closed posture. Then, the cap unit covers the ejecting portion and the lid portion closes the opening by moving the cap unit in the transport direction. As described above, since the lid portion is configured to be rotated, enlargement in size of the recording apparatus can be suppressed in a sliding direction of the lid portion, compared with a configuration in which the lid portion is slid.

A recording apparatus according to a second aspect is the recording apparatus according to the first aspect, in which the cap unit includes the cap portion and a receiving portion configured to receive the liquid ejected from the ejecting portion along the transport direction, and moves in the transport direction to switch between a state in which the cap portion faces the ejecting portion and a state in which the receiving portion faces the ejecting portion, the receiving portion is provided in the opening, and the lid portion covers the receiving portion when the cap portion covers the ejecting portion.

According to this aspect, in the configuration in which the cap unit has the cap portion and the receiving portion, the lid portion covers the receiving portion when the cap portion covers the ejecting portion, and thus it is possible to suppress drying of the receiving portion.

A recording apparatus according to a third aspect is the recording apparatus according to the second aspect, in which the receiving portion is disposed downstream of the cap portion in the transport direction, the cap unit has a standby position upstream of the recording portion in the transport direction, and has the standby position, an ejecting position at which the receiving portion faces the ejecting portion, and a cap position at which the cap portion covers the ejecting portion in this order from upstream to downstream in the transport direction, and the lid portion is disposed downstream of the recording portion in the transport direction.

According to this aspect, when the cap unit is located at the standby position, the receiving portion is located closer to the recording portion than the cap portion. As a result, when the liquid is ejected from the ejecting portion to the receiving portion in the middle of a recording job, time for moving the cap unit becomes shorter, and therefore, it is possible to suppress a decrease in recording throughput.

A recording apparatus according to a fourth aspect is the recording apparatus according to the first aspect, in which the lid portion is disposed upstream of the recording portion in the transport direction, and the cap unit has a standby position upstream of the recording portion in the transport direction, and moves between the standby position and a cap position where the cap portion covers the ejecting portion.

A recording apparatus according to the fifth aspect is the recording apparatus according to any one of the first aspect to the fourth aspect, in which the rotation mechanism portion includes a portion to be contacted provided in the recording portion and a contact portion that is provided in the lid portion and that is configured to change a contact position with the portion to be contacted along with a moving operation of the recording portion to rotate the lid portion.

According to this aspect, the contact portion changes the contact position with the portion to be contacted along with the moving operation of the recording portion, and thereby the lid portion is rotated. That is, since a drive source for rotating the lid portion may not be separately provided, and an installation space for the drive source may not be secured, it is possible to suppress an increase in size of the recording apparatus.

A recording apparatus according to a sixth aspect is the recording apparatus according to the fifth aspect, in which the portion to be contacted has a surface to be contacted, and a guide surface that is formed on a side of the support portion with respect to the surface to be contacted in the moving direction and that is configured to guide the contact portion to the surface to be contacted.

According to this aspect, the contact portion is guided to the surface to be contacted by coming into contact with the guide surface, and thus it is possible to suppress that the contact portion is caught by the portion to be contacted.

A recording apparatus according to a seventh aspect is the recording apparatus according to the fifth aspect, in which the contact portion is configured of a rotating member configured to rotate by contact with the portion to be contacted.

According to this aspect, since the rotating member moves while being rotated by contact with the portion to be contacted, a frictional force generated by contact between the contact portion and the portion to be contacted can be reduced, as compared with a configuration in which the contact portion does not include the rotating member.

A recording apparatus according to an eighth aspect is the recording apparatus according to any one of the first aspect to the fourth aspect, in which the rotation mechanism portion includes a cleaning portion configured to move in the width direction and configured to clean the ejecting portion, and a conversion portion configured to convert a linear motion of the cleaning portion along the width direction into a rotational motion of rotating the lid portion.

According to this aspect, when the cleaning portion is moved in the width direction after cleaning the ejecting portion, the conversion portion converts the linear motion of the cleaning portion into the rotational motion of rotating the lid portion. That is, since a drive source for rotating the lid portion may not be separately provided, and an installation space for the drive source may not be secured, it is possible to suppress an increase in size of the recording apparatus.

A recording apparatus according to a ninth aspect is the recording apparatus according to any one of the first aspect to the eighth aspect, in which the lid portion includes a lid member configured to close the opening, a projecting portion that projects in the moving direction from the lid member and that is configured to move the lid member in the transport direction by contact with the cap unit, a protruding portion protruding in the width direction from the lid member, and a side portion formed with a guide groove configured to support and guide the protruding portion so that the lid member approaches the opening in the moving direction of the recording portion along with an operation in which the cap unit presses the projecting portion in the transport direction.

According to this aspect, when the cap unit is moved to a position facing the lid portion in a state where the lid portion is in a posture along the transport direction, the cap unit presses the projecting portion in the transport direction, and thus, the lid member is moved in the moving direction. Here, as the lid portion moves, the protruding portion is guided by the guide groove, so that the lid member approaches the opening to close the opening. As described above, since the lid member configuring a part of the lid portion and the opening can be brought close to each other without changing the posture of the lid portion, formation of a gap between the lid portion and the opening can be suppressed.

A recording apparatus according to a tenth aspect is the recording apparatus according to any one of the first aspect to the ninth aspect, in which the moving mechanism portion moves the recording portion such that the moving direction intersects both a vertical direction and a horizontal direction.

According to this aspect, the moving mechanism portion moves the recording portion in the moving direction intersecting both the vertical direction and the horizontal direction. Gravity acting in the vertical direction on the recording portion is resolved into a component force along the moving direction and a component force along a direction orthogonal to the moving direction. Here, when the component force acting on the recording portion in the moving direction becomes smaller than the gravity acting on the recording portion in the vertical direction, a force required for moving the recording portion decreases, and thus an increase in load acting on the moving mechanism portion can be suppressed as compared with a configuration in which the recording portion is moved in the vertical direction.

Hereinafter, a printer 1 according to Embodiment 1 as an example of a recording apparatus according to the present disclosure will be described in detail.

FIG. 1 illustrates the printer 1 as the example of the recording apparatus. The printer 1 is configured as an ink jet type apparatus that performs recording by ejecting ink that is an example of liquid onto a medium P that is represented by a recording sheet. Note that an X-Y-Z coordinate system illustrated in each of the drawings is an orthogonal coordinate system.

A Y direction corresponds to a medium width direction and an apparatus depth direction that intersect a transport direction of the medium, and is, for example, a horizontal direction. In addition, the Y direction is an example of the apparatus depth direction intersecting both an A direction and a B direction, which will be described later. A direction toward the front in the Y direction is referred to as a +Y direction, and a direction toward the back is referred to as a −Y direction.

An X direction corresponds to an apparatus width direction, and is, for example, a horizontal direction. A direction toward the left in the X direction as viewed from an operator of the printer 1 is referred to as a +X direction, and a direction toward the right is referred to as a −X direction.

A Z direction corresponds to an apparatus height direction, and is, for example, a vertical direction. An upward direction in the Z direction is referred to as a +Z direction, and a downward direction is referred to as a −Z direction.

In the printer 1, the medium P is transported through a transport path T indicated by broken lines.

An A-B coordinate system illustrated in an X-Z plane is an orthogonal coordinate system. An A direction is a transport direction of the medium P in a region facing a line head 20, which will be described later, in the transport path T. An upstream direction in the A direction is referred to as a −A direction, and a downstream direction is referred to as a +A direction. In the present embodiment, the A direction is an inclined direction such that the +A direction is located more in the +Z direction than the −A direction. Specifically, the A direction is inclined in a range from 50° to 70° with respect to the horizontal direction, and more specifically, the A direction is inclined by approximately 60°. The B direction is an example of the moving direction, and is the moving direction in which the line head 20, which will be described later, advances or retreats with respect to a transport unit 10, which will be described later. A direction in which the line head 20 approaches the transport path T in the B direction is referred to as a +B direction, and a direction in which the line head 20 is away from the transport path T is referred to as a −B direction. In the present embodiment, the B direction is a direction inclined such that the −B direction is located more in the +Z direction than the +B direction, and the B direction is orthogonal to the A direction.

In this way, the transport direction of the medium P in a region that includes the transport unit 10 and at which recording is performed by the line head 20 is an inclined direction intersecting both the horizontal direction and the vertical direction.

The printer 1 includes a housing 2 as an example of a main body of the apparatus. A discharge portion 3 forming a space portion to which the medium P on which information has been recorded is to be discharged is formed in the +Z direction from the center in the Z direction of the housing 2. In addition, the housing 2 is provided with a plurality of medium cassettes 4.

The medium P is accommodated in each of the plurality of medium cassettes 4. The medium P accommodated in each medium cassette 4 is transported along the transport path T by a pick roller 6 and pairs of transport rollers 7 and 8. Into the transport path T, a transport path T1 in which the medium P is transported from an external apparatus and a transport path T2 in which the medium P is transported from a manual feed tray 9 provided in the housing 2 are merged.

In addition, the transport unit 10, which will be described later, a plurality of pairs of transport rollers 11 configured to transport the medium P, a plurality of flaps 12 configured to switch a path through which the medium P is transported, and a medium width sensor 13 configured to detect a width of the medium P in the Y direction are arranged in the transport path T.

The transport path T is curved in a region facing the medium width sensor 13, and extends obliquely upward from the medium width sensor 13, that is, in the A direction. A transport path T3 and a transport path T4 toward the discharge portion 3 and an inversion path T5 for reversing front and back sides of the medium P are provided downstream of the transport unit 10 in the transport path T. A discharge tray (not illustrated) is provided in the discharge portion 3 corresponding to the transport path T4.

Further, in the housing 2, ink containers 23 configured to store ink, a waste liquid reservoir 16 configured to store waste liquid of ink, and a controller 26 configured to control an operation of each portion of the printer 1. The ink containers 23 supply ink to the line head 20 through tubes (not illustrated). The waste liquid reservoir 16 stores ink as waste liquid discharged from the line head 20 toward a flushing portion 66 (see FIG. 9) for maintenance.

The controller 26 includes a central processing unit (CPU), a read only memory (ROM), a random access memory (RAM), and a storage, which are not illustrated, and controls transport of the medium P in the printer 1 and an operation of recording information on the medium P by the line head 20.

Figure 2:
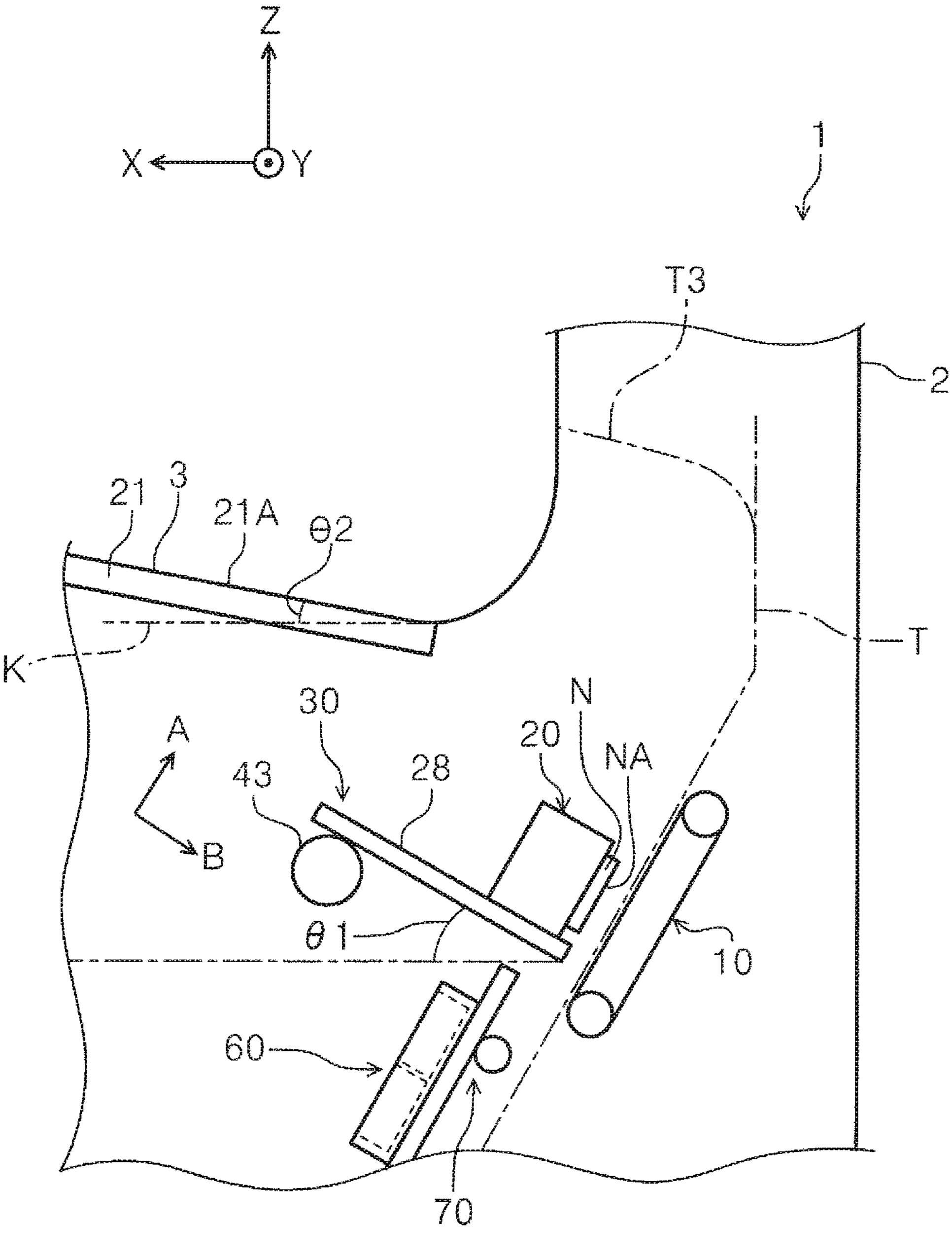
FIG. 2 is a schematic diagram illustrating an angle of a moving direction of a line head and an angle of a discharge tray according to Embodiment 1.

As illustrated in FIG. 2, a discharge tray 21 configuring a bottom portion of the discharge portion 3 is a member formed in a plate shape as an example of a mounting member, and has a mounting surface 21A on which the discharged medium P is mounted. Further, the discharge tray 21 is provided downstream of the transport unit 10, which will be described later, in the transport path T of the medium P and in the +Z direction with respect to the line head 20, which will be described later, in the Z direction.

Specifically, the discharge tray 21 extends in an oblique direction such that a portion in the +X direction is located more in the +Z direction than a portion in the −X direction. In other words, in the transport direction of the medium P, a downstream end portion of the discharge tray 21 is located more in the +Z direction than an upstream end portion. The mounting surface 21A has an inclination obliquely upward along a discharge direction of the medium P. The B direction is directed obliquely upward along a direction in which the line head 20, which will be described later, is away from the transport unit 10, which will be described later. Note that, in FIG. 2, the respective constituent portions of the printer 1 are illustrated in a simplified manner.

When viewed from the Y direction, an angle formed by the B direction and the X direction (an example of the horizontal direction) is referred to as a first angle θ1. Further, an angle formed by an inclination direction of the mounting surface 21A and the X direction is referred to as a second angle θ2. The second angle θ2 is expressed as an angle formed by the mounting surface 21A and a virtual plane K along the X direction. The first angle θ1 is, for example, larger than the second angle θ2. The B direction is an example of the moving direction in which the line head 20, which will be described later, faces the transport unit 10.

The printer 1 includes, as a main portion, the transport unit 10 that transports the medium P, the line head 20 that records information on the medium P, and a head moving unit 30 that moves the line head 20 in the B direction.

As illustrated in FIG. 1, the transport unit 10 is an example of the support portion, and includes two pulleys 14, an endless transport belt 15 wound around the two pulleys 14, and a motor (not illustrated) configured to drive the pulleys 14. The medium P is transported at a position facing the line head 20 while being attracted onto a belt surface of the transport belt 15. As a method of attracting the medium P onto the transport belt 15, a known attraction method such as an air suction method or an electrostatic attraction method can be adopted. As described above, the transport belt 15 supports the medium P while attracting the medium P. The transport unit 10 is disposed so as to face the line head 20 in the B direction.

The line head 20 is an example of the recording portion. Further, the line head 20 has nozzles N configured to eject ink as an example of the liquid. The nozzle N is an example of the ejecting portion. Additionally, the line head 20 is disposed so as to face the transport unit 10 in the B direction at a recording position, which will be described later, and records information on the medium P by ejecting the ink from the nozzles N. The line head 20 is an ink ejecting head that is configured such that the nozzles N configured to eject the ink cover the entire region in the Y direction as the width direction of the medium P. Further, a nozzle surface on which the nozzles N are arranged is disposed along the A direction and the Y direction.

Further, the line head 20 is configured as the ink ejecting head that can perform recording on the entire region in the width direction of the medium P without moving in the width direction of the medium P. However, the ink ejecting head is not limited to this type, and may be a type that is mounted on a carriage and ejects ink while moving in the width direction of the medium P.

Figure 4:
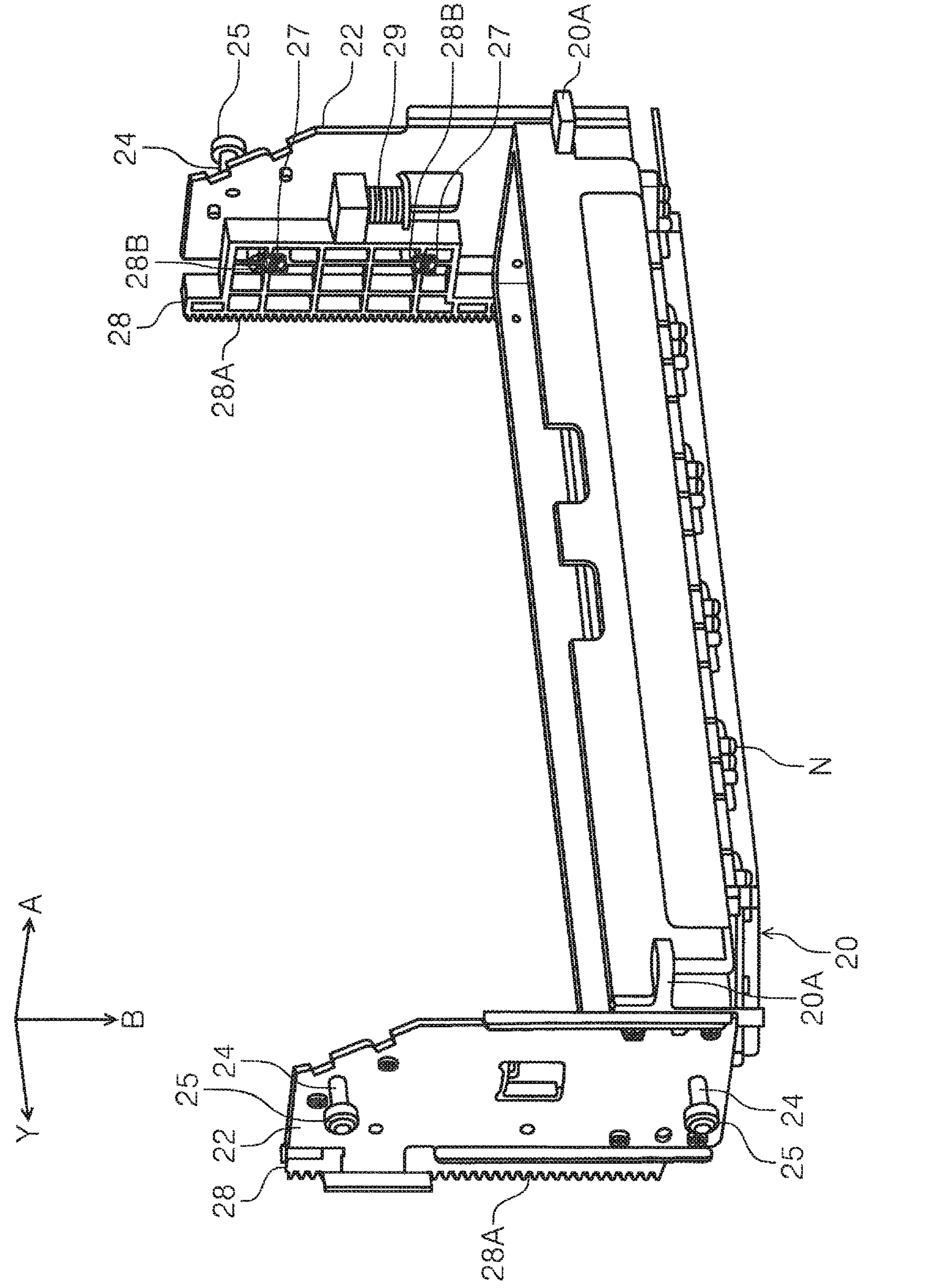
FIG. 4 is an enlarged perspective view of the line head according to Embodiment 1.

As illustrated in FIG. 4, the line head 20 extends in the Y direction. Plate portions 20A protrude toward the +A direction on a side portion in the +A direction at both end portions in the Y direction of the line head 20. Further, a support frame 22 is attached to each of both end portions of the line head 20 in the Y direction.

The support frame 22 is configured as a side plate along an A-B plane, and extends in the −B direction with respect to the line head 20. Respective columnar support pins 24 extending in the +Y direction and the −Y direction are provided at both end portions in the B direction of an outer surface of the support frame 22 in the Y direction. An annular roller 25 is rotatably provided on the support pin 24.

Further, on an inner surface in the Y direction of the support frame 22, support pins 27, a rack 28, and a coil spring 29 are provided. The support pins 27 protrude in the Y direction from the support frame 22.

The rack 28 is a plate-shaped member having a thickness direction in the Y direction, and extends in the B direction. A plurality of tooth portions 28A arranged in the B direction is formed on an end portion of the rack 28 in the −A direction. Further, the rack 28 has elongated holes 28B each of which penetrates in the Y direction and extends in the B direction. The support pin 27 is inserted into the elongated hole 28B. Accordingly, the rack 28 can relatively move with respect to the support frame 22 in the B direction.

One end portion of the coil spring 29 is attached to the support frame 22. The other end portion of the coil spring 29 is attached to the rack 28. As a result, the coil spring 29 applies an elastic force to the rack 28 in the B direction.

Figure 3:
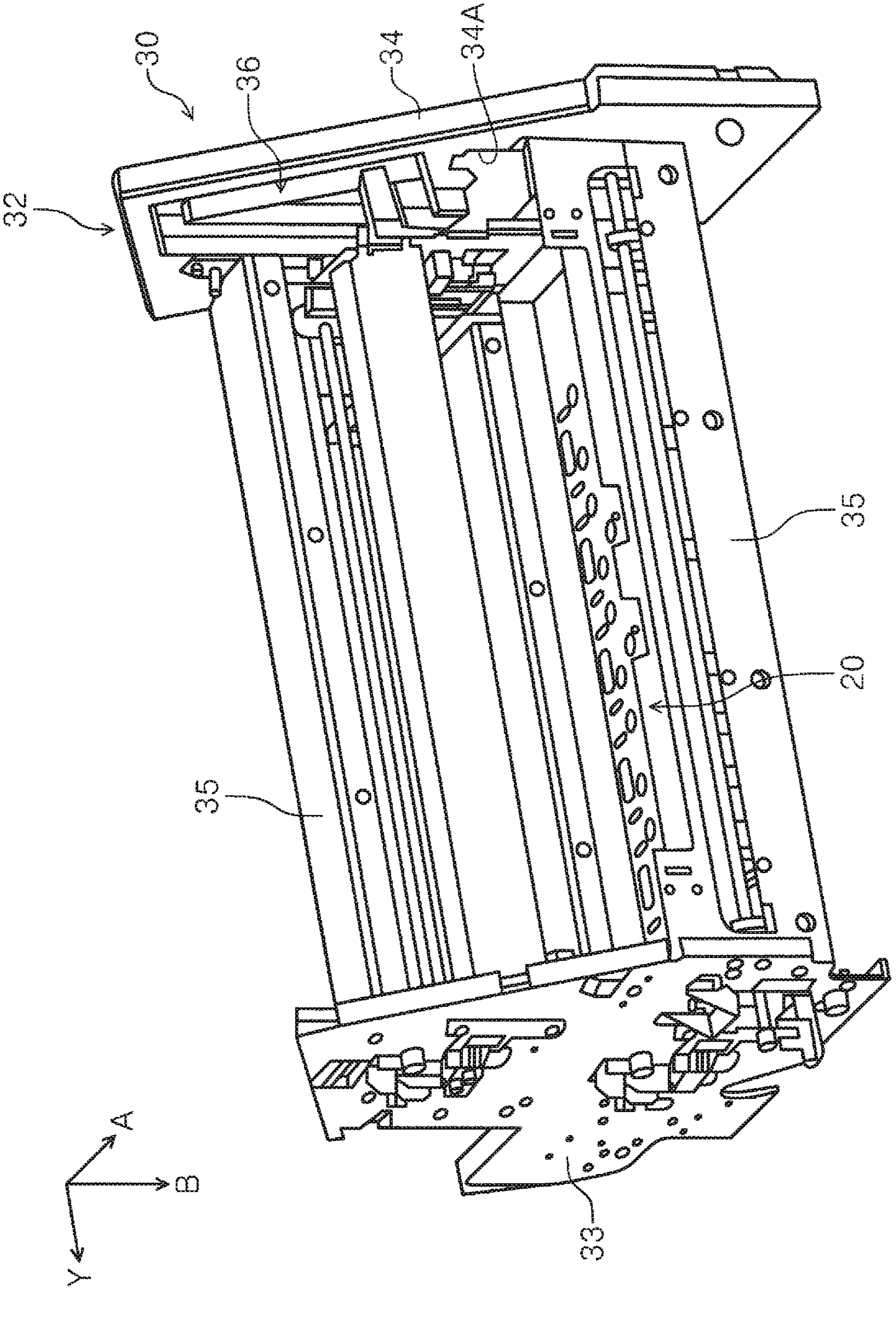
FIG. 3 is a perspective view illustrating a structure around the line head according to Embodiment 1.

As illustrated in FIG. 3, the line head 20 is detachable from the head moving unit 30, which will be described later, at a replacement position farthest from the transport unit 10 (see FIG. 1) in the B direction. Specifically, the line head 20 is configured to be detached from the head moving unit 30 by moving the support frame 22 in the −B direction along a guide rail 37 (see FIG. 5), which will be described later, and further pulling up the support frame 22 in the +Z direction along a guide rail 38.

As illustrated in FIG. 2, the head moving unit 30 is an example of the moving mechanism portion, and moves the line head 20 to a recording position and a retreat position, which will be described later, along the B direction. In other words, the head moving unit 30 moves the line head 20 in the B direction such that the moving direction of the line head 20 intersects both the vertical direction and the horizontal direction.

As illustrated in FIG. 3, the head moving unit 30 includes a main body frame 32 configuring a main body, a guide member 36 configured to guide the line head 20 (see FIG. 1) in the B direction, a drive unit 40 (see FIG. 5) configured to drive the line head 20 in the B direction, and an adjustment unit 46 (see FIG. 6) configured to adjust a position of the line head 20 in the B direction. Then, the head moving unit 30 moves the line head 20 to one or more retreat positions, which will be described later, separated from the transport unit 10 with respect to the recording position, which will be described later. Specifically, the head moving unit 30 is provided with the line head 20 movable to a first position, a second position, and a third position. Note that the first position, the second position, and the third position will be described later.

The main body frame 32 is included in the housing 2. That is, the main body frame 32 is included in an example of the main body of the apparatus. Specifically, the main body frame 32 has a side frame 33 and a side frame 34, and a plurality of lateral frames 35.

Each of the side frames 33 and 34 is configured as a side plate along the A-B plane, and the side frames 33 and 34 are arranged so as to face each other at an interval in the Y direction. The side frame 33 is arranged in the +Y direction, and the side frame 34 is arranged in the −Y direction. The side frame 34 is formed with a through-hole 34A for moving a second maintenance unit 72 (see FIG. 10), which will be described later.

The plurality of lateral frames 35 couple the side frames 33 and 34 in the Y direction. In addition, the line head 20 is disposed in a space surrounded by the plurality of lateral frames 35.

The guide member 36 is an example of a guide portion, and one guide member 36 is provided on each of the side frames 33 and 34. Note that the two guide members 36 are substantially symmetrically arranged with respect to the center in the Y direction of the main body frame 32. For this reason, the guide member 36 in the −Y direction will be described, and description of the guide member 36 in the +Y direction will be omitted.

Figure 5:
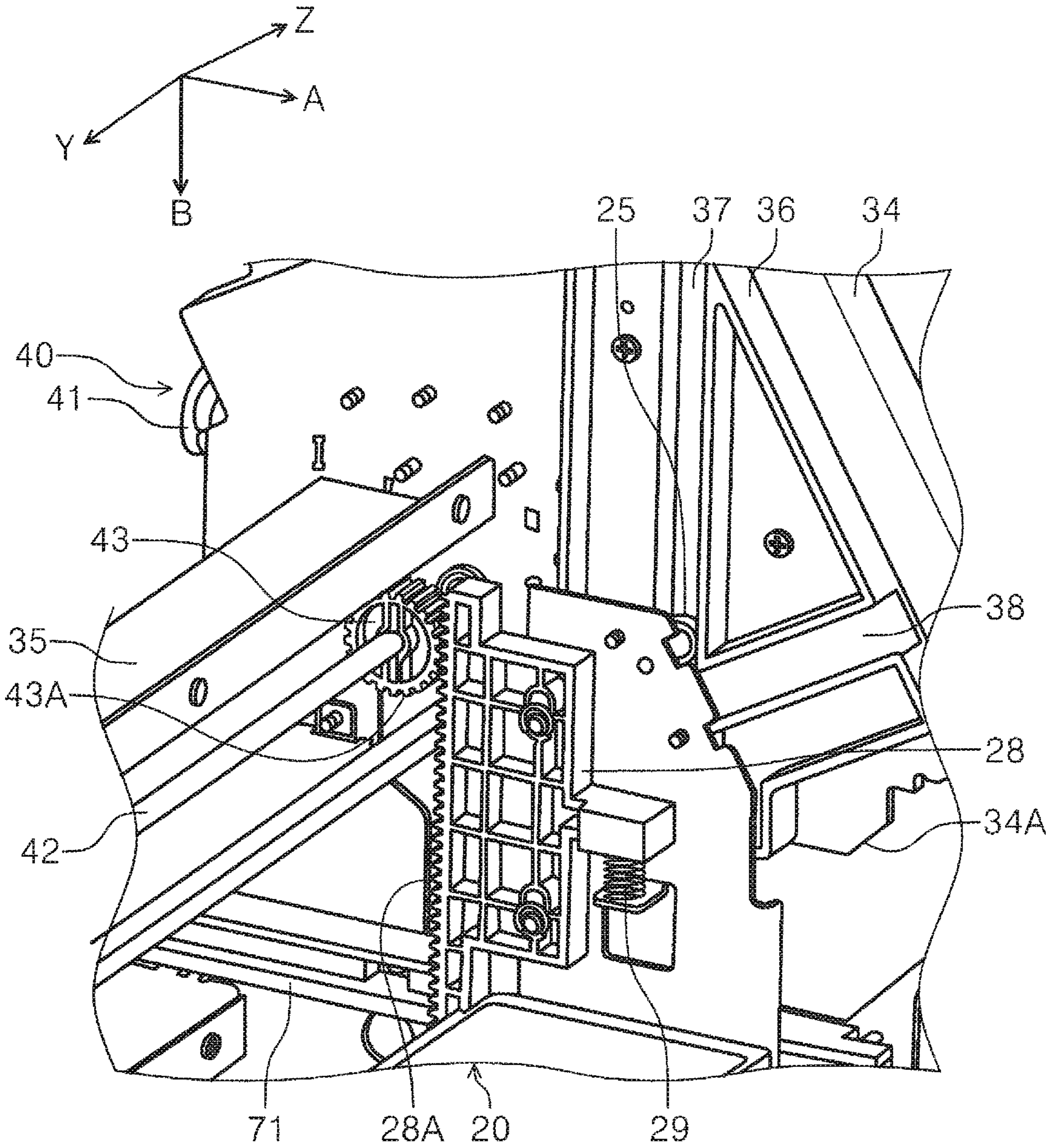
FIG. 5 is an enlarged perspective view of a part of the line head and a main body frame according to Embodiment 1.

As illustrated in FIG. 5, the guide member 36 is attached to the side surface of the side frame 34 in the +Y direction. The guide rail 37 extending in the B direction, and the guide rail 38 branching from a middle portion of the guide rail 37 and extending in the Z direction are formed in the guide member 36. Each of the guide rails 37 and 38 is a groove opening in the +Y direction. Further, the guide rails 37 and 38 guide the roller 25 in the B direction or the Z direction.

Note that an end portion of the guide rail 37 in the −B direction is bent toward the +Z direction (see FIG. 3). Further, of the guide member 36 in the −Y direction, a portion that overlaps the through-hole 34A in the Y direction is removed. In other words, the guide member 36 is also provided in the +B direction with respect to the through-hole 34A.

Figure 8:
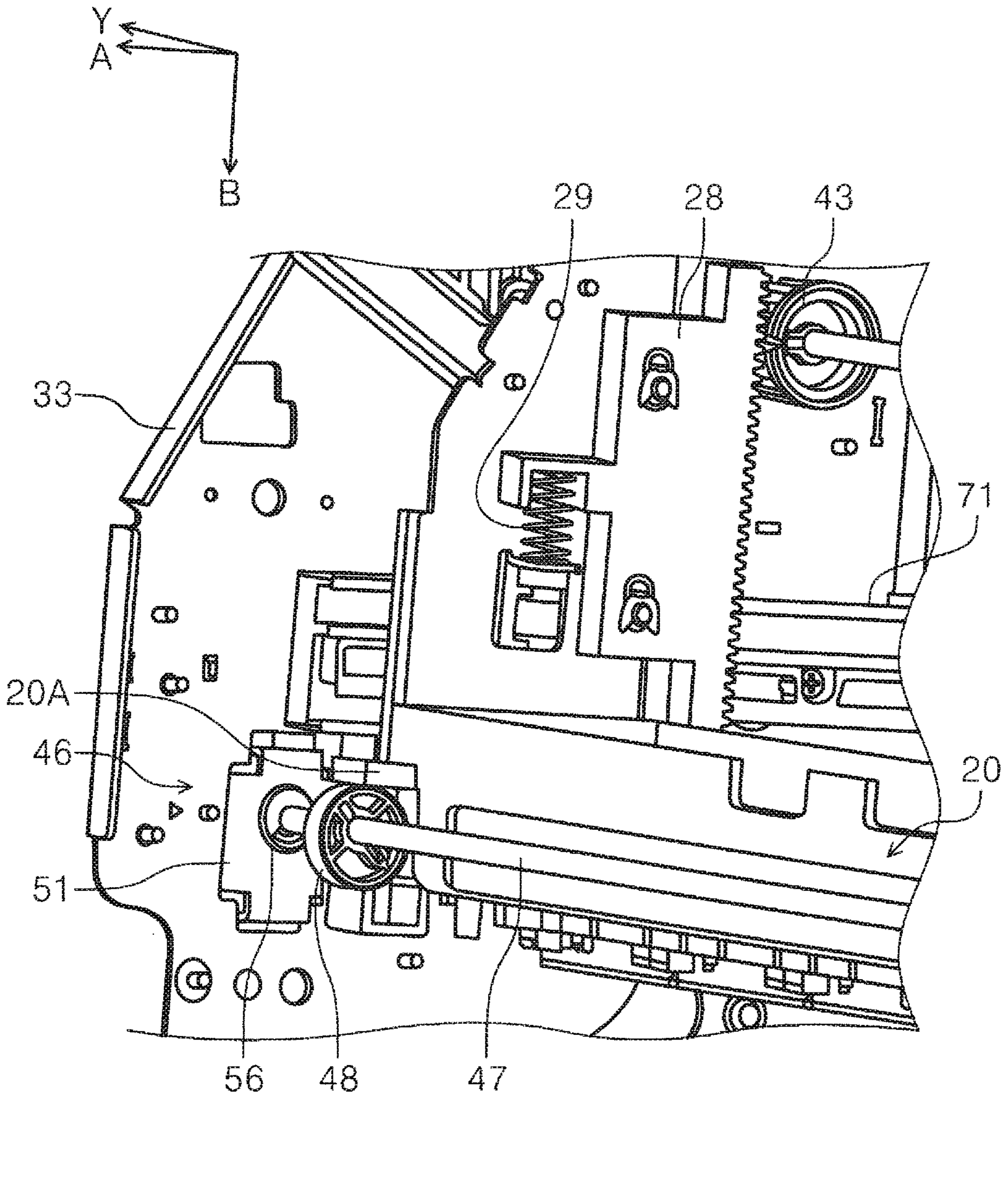
FIG. 8 is an enlarged perspective view of a part of the line head and the adjustment unit of FIG. 7.

As illustrated in FIG. 5 and FIG. 8, one pair of guide rails 71 is provided in the side frames 33 and 34. The one pair of guide rails 71 is formed in a groove shape opening inside in the Y direction, and extends in the A direction. Further, the one pair of guide rails 71 supports a plurality of rollers 73, which will be described later, so as to be movable in the A direction. That is, the guide rails 71 guide the plurality of rollers 73 (see FIG. 10) in the A direction, so that a maintenance unit 60 (see FIG. 9), which will be described later, can move in the A direction.

As illustrated in FIG. 5, the drive unit 40 includes a motor 41, a gear unit (not illustrated), a shaft 42, and pinions 43, and the drive is controlled by the controller 26 (see FIG. 1).

The shaft 42 extends in the Y direction. Both end portions of the shaft 42 are rotatably supported by the side frame 33 (see FIG. 3) and the side frame 34.

The pinion 43 is attached to each of both end portions of the shaft 42 in the Y direction. Tooth portions 43A configured to engage with the tooth portions 28A (see FIGS. 3-5) are formed on an outer peripheral portion of the pinion 43.

The motor 41 rotates the shaft 42 and the pinions 43 in one direction or in the reverse direction via a gear portion (not illustrated). As described above, the drive unit 40 rotationally drives the pinions 43, thereby moving the line head 20 in the B direction.

Figure 6:
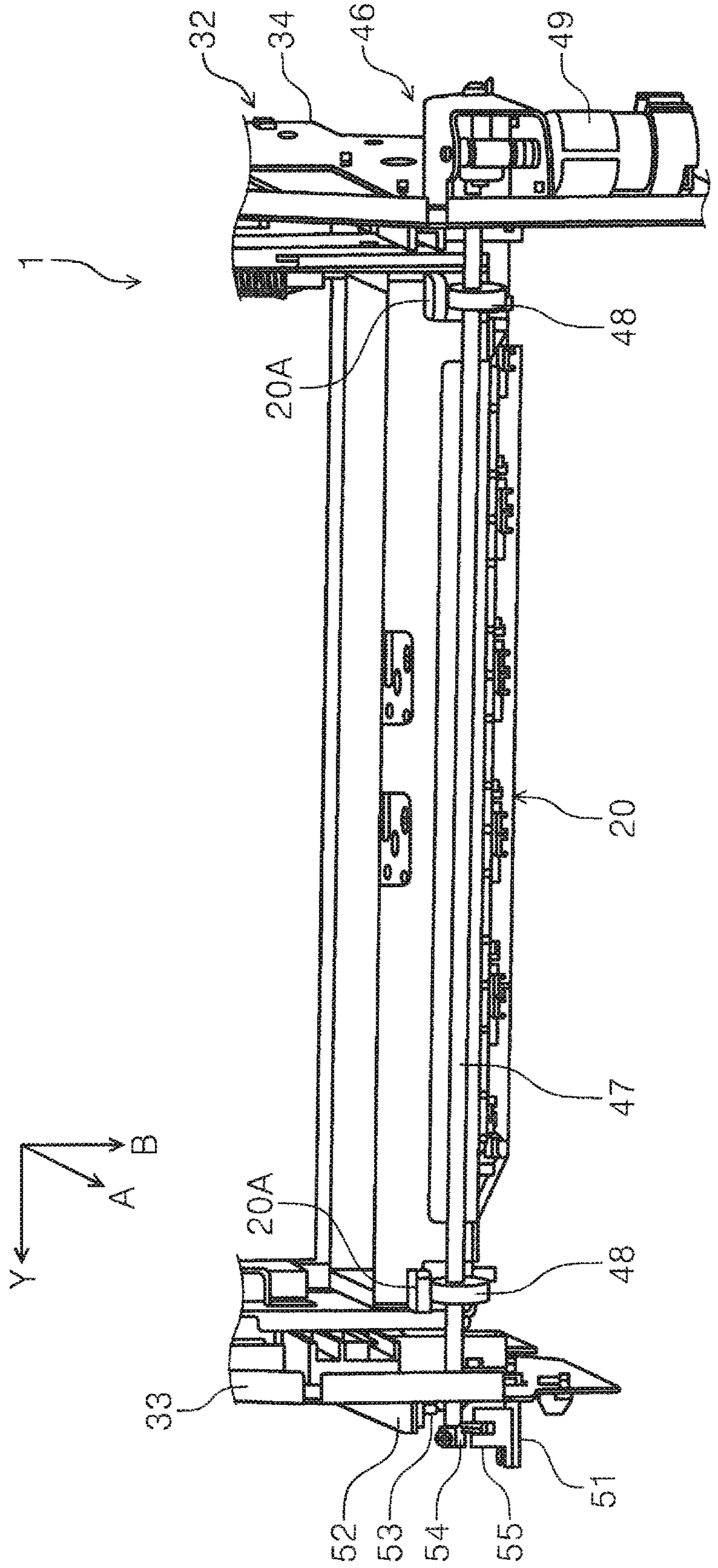
FIG. 6 is a perspective view illustrating the line head and an adjustment unit according to Embodiment 1.

As illustrated in FIG. 6, the adjustment unit 46 is an example of an adjustment portion, and is provided on the main body frame 32. Specifically, the adjustment unit 46 includes a cam shaft 47, two eccentric cams 48, a motor 49, a holder 51, a bracket 52, an adjustment screw 53, a member to be detected 54, a position sensor 55, and a bearing 56 (see FIG. 7).

The cam shaft 47 is a member long in the Y direction, and extends from the side frame 33 to the side frame 34.

The two eccentric cams 48 are attached to the cam shaft 47. Further, outer peripheral surfaces of the two eccentric cams 48 are in contact with portions in the +B direction of the plate portions 20A of the line head 20. As a result, by rotating the two eccentric cams 48 along with the rotation of the cam shaft 47, the position of the line head 20 is adjusted in the B direction.

The motor 49 is provided on the side frame 34. Further, the motor 49 is driven and controlled by the controller 26 (see FIG. 1) to rotate the cam shaft 47 in one direction or in the reverse direction.

Figure 7:
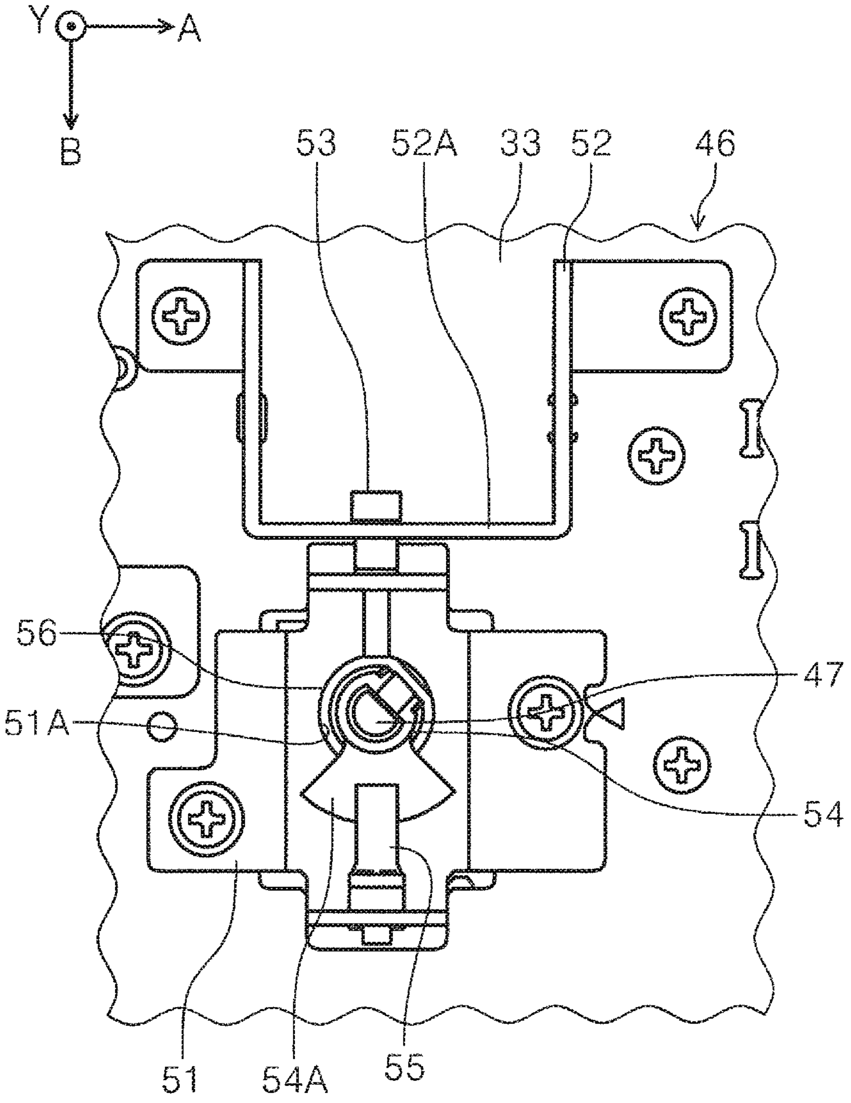
FIG. 7 is a front view of the adjustment unit according to Embodiment 1.

As illustrated in FIG. 7, the holder 51 is made of sheet metal, and is attached to the side frame 33. The holder 51 is formed with a through-hole 51A penetrating in the Y direction. The bearing 56 is inserted into the through-hole 51A so as to be movable in the B direction. Accordingly, the holder 51 supports the bearing 56. The cam shaft 47 is inserted into the bearing 56. After the drive unit 40 moves the line head 20 in the B direction, and then, the plate portions 20A are brought into contact with the eccentric cams 48, the holder 51 may move the line head 20 to an expected position where the line head 20 is to be disposed by rotating the eccentric cams 48.

The bracket 52 is attached to a portion of the side frame 33 in the −B direction with respect to the holder 51. In addition, the bracket 52 has a support plate 52A that rotatably supports the adjustment screw 53. An end portion of the adjustment screw 53 in the +B direction is engaged with a screw hole of the holder 51. Accordingly, by rotating the adjustment screw 53 to move the holder 51 up and down, it is possible to adjust the position of the cam shaft 47 in the B direction and the position of the line head 20 (see FIG. 1) in the B direction.

The member to be detected 54 is attached to an end portion of the cam shaft 47 in the +Y direction. In addition, the member to be detected 54 has a fan-shaped portion 54A that is projected in a radial direction from the cam shaft 47.

The position sensor 55 is attached to the holder 51. Additionally, the position sensor 55 is, for example, an optical sensor including a light-emitting portion and a light-receiving portion (not illustrated), and light is blocked by the fan-shaped portion 54A. That is, the position sensor 55 detects an angle of rotation of the cam shaft 47 based on whether or not light is blocked.

As illustrated in FIG. 8, the adjustment unit 46 rotates the eccentric cams 48 according to the expected position where the line head 20 is to be disposed. In other words, the expected position is an interval in the B direction between the line head 20 and the transport unit 10 (see FIG. 1). After the eccentric cams 48 are rotated, the drive unit 40 moves the line head 20 in the B direction, so that the plate portions 20A are brought into contact with the eccentric cams 48. At this time, an error at a stop position of the rack 28 is absorbed by compressive deformation of the coil spring 29. After the drive unit 40 moves the line head 20 in the B direction and the plate portions 20A are brought into contact with the eccentric cams 48, the eccentric cams 48 may be rotated to move the line head 20 to the expected position where the line head 20 is to be disposed.

As illustrated in FIG. 6, while the adjustment unit 46 automatically adjusts the position of the line head 20 in the B direction by driving the motor 49 in the −Y direction, the adjustment unit 46 can adjust a deviation in the B direction of the end portion in the +Y direction with respect to the end portion in the −Y direction by a manual operation of the adjustment screw 53 by an operator in the +Y direction. Note that the adjustment unit 46 is used in order to adjust the position of the line head 20 when the line head 20 is located at the recording position, which will be described later.

Figure 9:
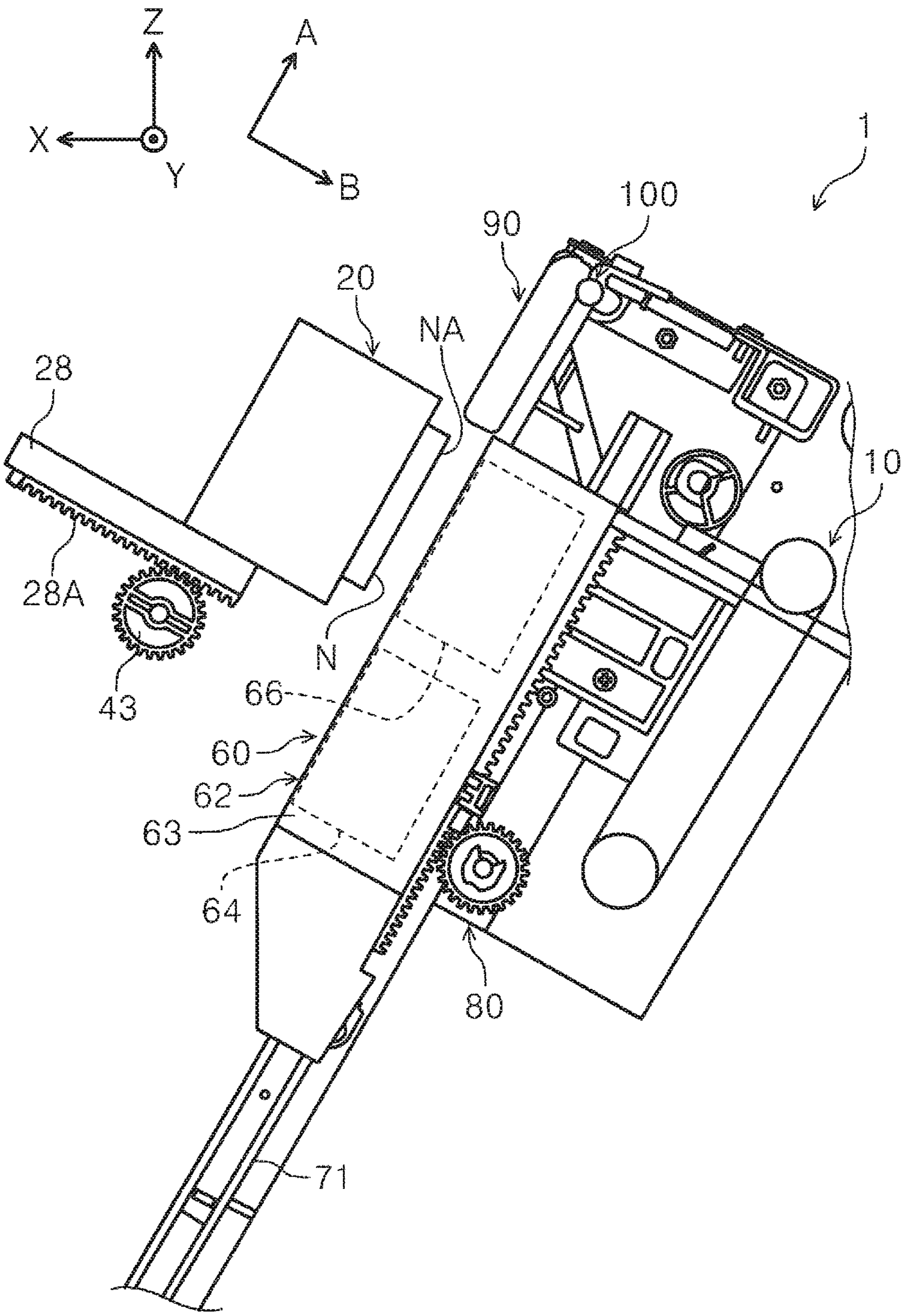
FIG. 9 is a diagram illustrating arrangement of the line head and a maintenance unit according to Embodiment 1.

As illustrated in FIG. 9, the printer 1 further includes the maintenance unit 60, a drive unit 80, a lid unit 90, and a rotation mechanism portion 100.

The maintenance unit 60 is an example of a storage portion that stores the nozzles N and that performs maintenance of the nozzles N. Further, the maintenance unit 60 is provided so as to be movable in the A direction by the drive unit 80, which will be described later. Specifically, the maintenance unit 60 includes a first maintenance unit 62 configured to cover the nozzles N and the second maintenance unit 72 (see FIG. 10) configured to clean the nozzles N by wiping an ink ejecting surface NA of the nozzle N.

The first maintenance unit 62 is an example of the cap unit. Further, the first maintenance unit 62 includes a cover body 63, a cap portion 64 configured to cover the nozzles N, and a flushing portion 66 configured to cover the nozzles N and configured to receive ink ejected from the nozzles N.

Further, the first maintenance unit 62 is provided with the cap portion 64 and the flushing portion 66 along the A direction, and moves in the A direction to switch between a state in which the cap portion 64 faces the nozzles N and a state in which the flushing portion 66 faces the nozzles N.

Further, the first maintenance unit 62 has a standby position upstream of the line head 20 in the A direction, and has the standby position, an ejecting position, and a cap position in this order from upstream to downstream in the A direction.

The ejecting position is a position of the first maintenance unit 62 when the flushing portion 66 faces the nozzles N.

The cap position is a position of the first maintenance unit 62 when the cap portion 64 covers the nozzles N.

Figure 10:
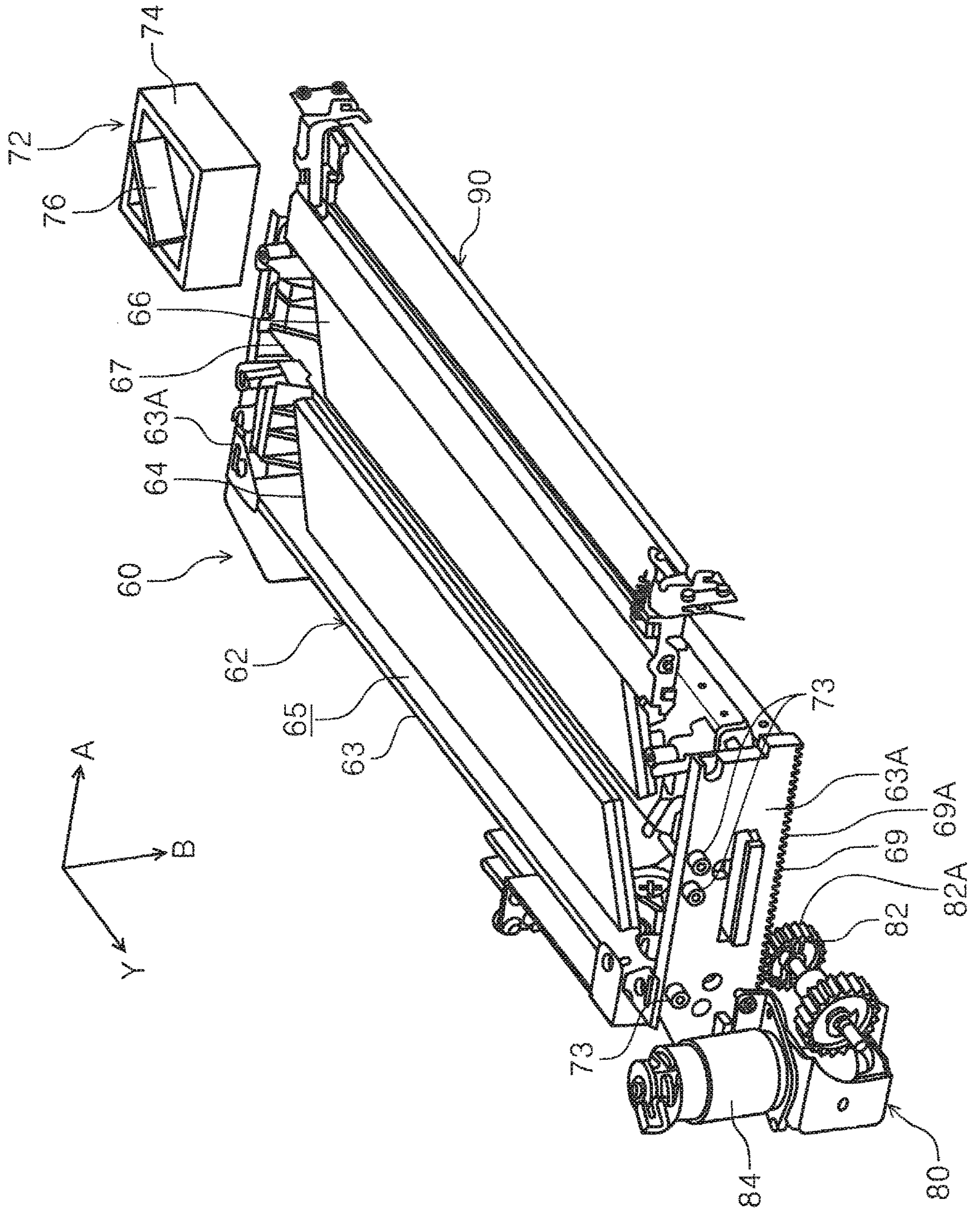
FIG. 10 is a perspective view of the maintenance unit according to Embodiment 1.

As illustrated in FIG. 10, the cover body 63 is formed in a box shape that is long in the Y direction and that is short in the A direction. The cover body 63 is formed with an opening 65 that opens in the −B direction. A rack 69 extending in the A direction is formed on a side wall 63A in the +Y direction of the cover body 63. The rack 69 has a plurality of tooth portions 69A aligned in the A direction. In addition, on both side walls 63A, a plurality of rollers 73 each of which is rotatable about the Y direction serving as an axis direction is provided.

A partition wall 67 is provided inside the cover body 63. The partition wall 67 partitions a space in the cover body 63 into a space in the +A direction and a space in the −A direction. The cap portion 64 is arranged in the space in the −A direction of the partition wall 67, and the flushing portion 66 is arranged in the space in the +A direction of the partition wall 67.

The cap portion 64 has a size and a shape that cover the ejecting surface NA (see FIG. 9). Further, the cap portion 64 is disposed so as to face the ejecting surface NA in the B direction to cover the ejecting surface NA. The cap portion 64 covers the ejecting surface NA, so that drying of the nozzles N is suppressed, and an increase in viscosity of the ink is suppressed. Note that the cap portion 64 can cover the nozzles N when the line head 20 (see FIG. 1) is located at the retreat position.

The flushing portion 66 is an example of the receiving portion, and is provided in the opening 65. Further, the flushing portion 66 is disposed downstream of the cap portion 64 in the A direction. In other words, in a state where the first maintenance unit 62 is disposed at the standby position, the flushing portion 66 is disposed at a position closer to the line head 20 than the cap portion 64 in the A direction. Further, the flushing portion 66 is configured as a flushing box that is opened in the −B direction and that has porous fiber such as felt. Then, the flushing portion 66 captures the ink ejected from the nozzles N. Note that the flushing portion 66 can cover the nozzles N when the line head 20 is located at the retreat position.

In the nozzles N, when the viscosity of the ink increases, the viscosity of the ink is maintained within a set range by ejecting the ink toward the flushing portion 66. Accordingly, ejection failure of the ink from the nozzles N is suppressed.

The second maintenance unit 72 includes a main body portion 74 and a blade 76 as an example of the cleaning portion. The main body portion 74 is formed in a box shape that opens in the −B direction.

The blade 76 is made of, for example, rubber having a rectangular plate shape. Further, the blade 76 is provided in the main body portion 74 in a state where a portion that wipes the nozzles N (see FIG. 1) protrudes in the −B direction from the main body portion 74, and the portion is inclined with respect to the A direction and the Y direction.

The second maintenance unit 72 is configured to advance and retreat in the Y direction by a drive unit (not illustrated). The drive unit (not illustrated) includes, as an example, a belt to which a motor and the second maintenance unit 72 are attached, and is configured to move the second maintenance unit 72 in the Y direction by rotating and moving the belt due to the rotation of the motor. Note that the second maintenance unit 72 is retreated in the −Y direction with respect to the side frame (see FIG. 3) when the first maintenance unit 62 covers the line head 20 and when the line head 20 performs recording.

The drive unit 80 is an example of the drive portion that advances or retreats the maintenance unit 60 in the A direction. Specifically, the drive unit 80 has a gear 82 having tooth portions 82A configured to engage with the tooth portions 69A of the rack 69, and a motor 84 configured to rotate the gear 82. The drive control of the drive unit 80 is performed by the controller 26 (see FIG. 1).

When the line head 20 (see FIG. 1) is located at the retreat position, which will be described later, the drive unit 80 causes the maintenance unit 60 to advance between the line head 20 and the transport unit 10 (see FIG. 1). In addition, the drive unit 80 causes the maintenance unit 60 to retreat in the −A direction from between the line head 20 and the transport unit 10 before the line head 20 is located at the recording position, which will be described later.

Figure 11:
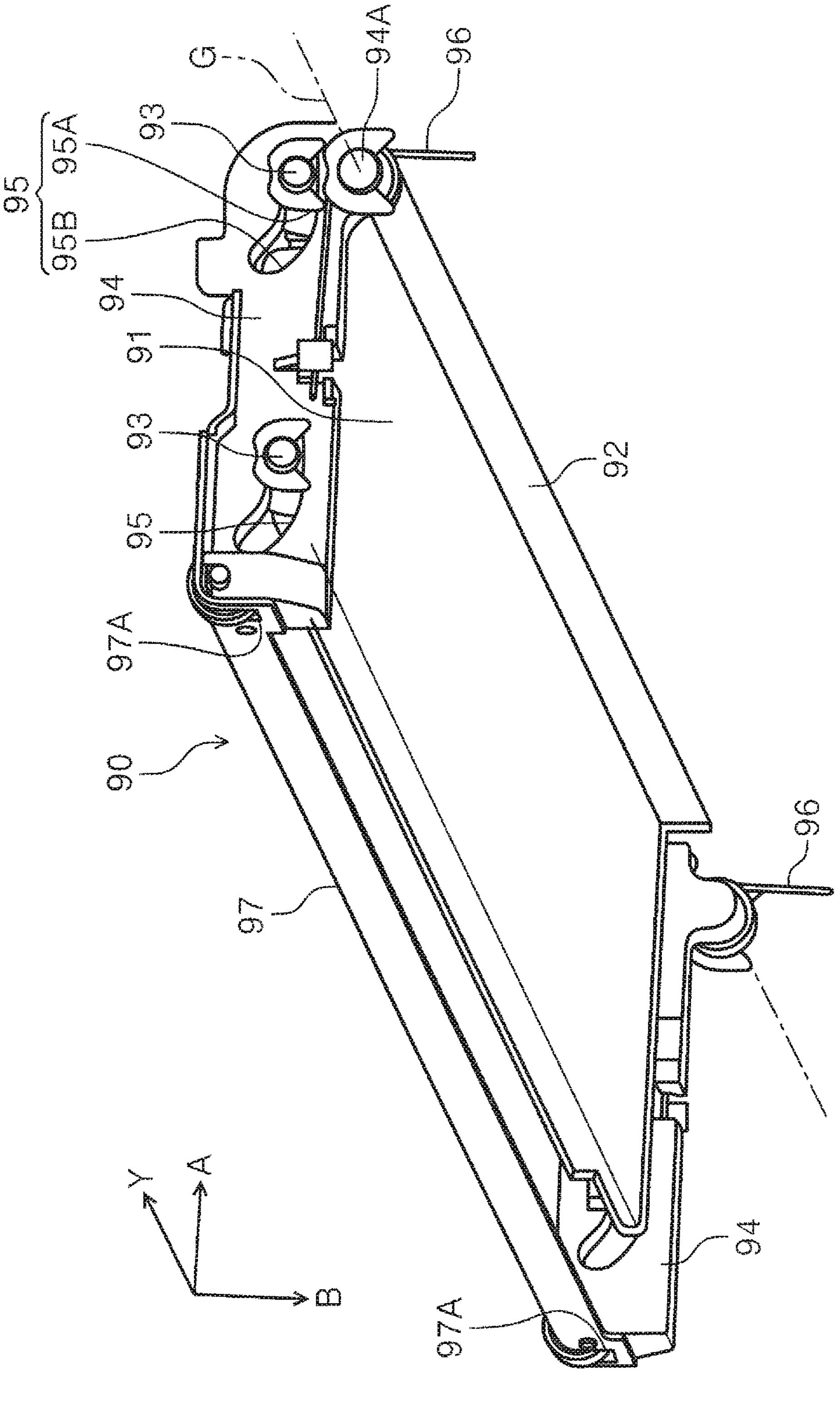
FIG. 11 is a perspective view of a lid unit according to Embodiment 1.

As illustrated in FIG. 11, the lid unit 90 is an example of the lid portion that closes the opening 65 (see FIG. 10) in a closed posture along the A direction. Additionally, the lid unit 90 is formed in a rectangular parallelepiped shape that is entirely long in the Y direction, and is rotatable about a rotation axis G extending in the Y direction. In addition, the lid unit 90 is disposed downstream of the line head 20 in the A direction (see FIG. 1).

Specifically, the lid unit 90 has a plate-shaped portion 91, a projecting portion 92 projecting from the plate-shaped portion 91 in the B direction, pin portions 93 formed in the plate-shaped portion 91, and side plates 94 disposed in the +Y direction and the −Y direction with respect to the plate-shaped portion 91. Further, the lid unit 90 has torsion springs 96, a cover member 97, brackets 98 (see FIG. 12), and tension springs 99 (see FIG. 12). Note that the lid unit 90 is symmetrically formed with respect to the center in the Y direction, for example. For this reason, each portion in the +Y direction of the lid unit 90 will be described, and description of each portion in the −Y direction will be omitted.

The plate-shaped portion 91 is an example of a lid member. Further, the plate-shaped portion 91 is a member that closes the opening 65 (see FIG. 10) from the +B direction. The plate-shaped portion 91 is formed in a rectangular shape that is long in the Y direction and that is short in the A direction when viewed from the B direction. A length of the plate-shaped portion 91 in the A direction is longer than a length of the cap portion 64 (see FIG. 10) in the A direction, and is longer than a length of the flushing portion 66 (see FIG. 10) in the A direction.

The projecting portion 92 is a portion projecting from an end portion in the +A direction of the plate-shaped portion 91 toward the +B direction. Further, the projecting portion 92 is located in the +A direction with respect to the maintenance unit 60 (see FIG. 10). Here, the projecting portion 92 and the plate-shaped portion are integrated with each other. Accordingly, the maintenance unit 60 is moved toward the +A direction, and the projecting portion 92 and the maintenance unit 60 are brought into contact with each other, whereby the plate-shaped portion 91 is moved in the +A direction.

The two pin portions 93 are an example of the protruding portion, and protrude in the +Y direction and the −Y direction from both end portions in the Y direction of the plate-shaped portion 91. In addition, each of the two pin portions 93 is formed in a columnar shape having an axial direction in the Y direction. Further, the two pin portions 93 are located so as to be spaced apart from each other in the A direction.

The side plate 94 is an example of the side portion, and is formed in a plate shape having a thickness direction in the Y direction. A support shaft portion 94A that has a columnar shape and that protrudes toward each outer side in the Y direction is formed at end portion in the +B direction and at an end portion in the +A direction of the side plate 94. A central axis of the support shaft portion 94A corresponds to the rotation axis G. Further, the support shaft portion 94A is supported by a frame (not illustrated) provided in the housing 2 (see FIG. 1). Further, two guide grooves 95 are formed in the side plate 94.

The two guide grooves 95 are formed at an interval in the A direction, and penetrate through the side plate 94 in the Y direction. In addition, each of the two guide grooves 95 includes, for example, a first groove portion 95A and a second groove portion 95B. Each of the first groove portion 95A and the second groove portion 95B is formed as an elongated hole having a size that allows the pin portion 93 to be inserted. Further, the first groove portion 95A and the second groove portion 95B support and guide the pin portion 93.

The first groove portion 95A extends in the A direction at a portion in the +B direction of the side plate 94 when viewed from the Y direction.

When viewed from the Y direction, the second groove portion 95B extends in an oblique direction so as to be located more in the −B direction from an end portion in the +A direction of the first groove portion 95A toward the −A direction.

When the pin portion 93 is supported and guided in the first groove portion 95A, arrangement is in a state closest to the transport unit 10 (see FIG. 1). In addition, when the pin portion 93 is supported and guided in the second groove portion 95B, the arrangement is in a state farther away from the transport unit 10 in the B direction as the pin portion 93 goes toward −A direction in the second groove portion 95B.

Here, in the lid unit 90, the side plate 94 supports the pin portions 93 such that the plate-shaped portion 91 approaches the opening 65 (see FIG. 10) in the B direction along with an operation of pressing the projecting portion 92 in the +A direction by the maintenance unit 60 (see FIG. 10).

The torsion spring 96 biases the lid unit 90 by attaching one end portion to the side plate 94 and attaching the other end portion to a frame (not illustrated) in a state in which the support shaft portion 94A is inserted. Accordingly, the posture of the lid unit 90 is the closed posture in which the plate-shaped portion 91 is along the A direction.

The cover member 97 couples portions in the −A direction with respect to the centers of the two side plates 94 in the A direction, along the Y direction. Further, the cover member 97 covers a portion in the −A direction with respect to the center of the plate-shaped portion 91 in the A direction, from the −B direction. Cutout portions 97A open toward the −A direction are formed in an end portion in the −A direction at both end portions of the cover member 97 in the Y direction. Further, in an end portion in the +A direction of the cover member 97, hook portions 97B (see FIG. 12) are formed.

Figure 12:
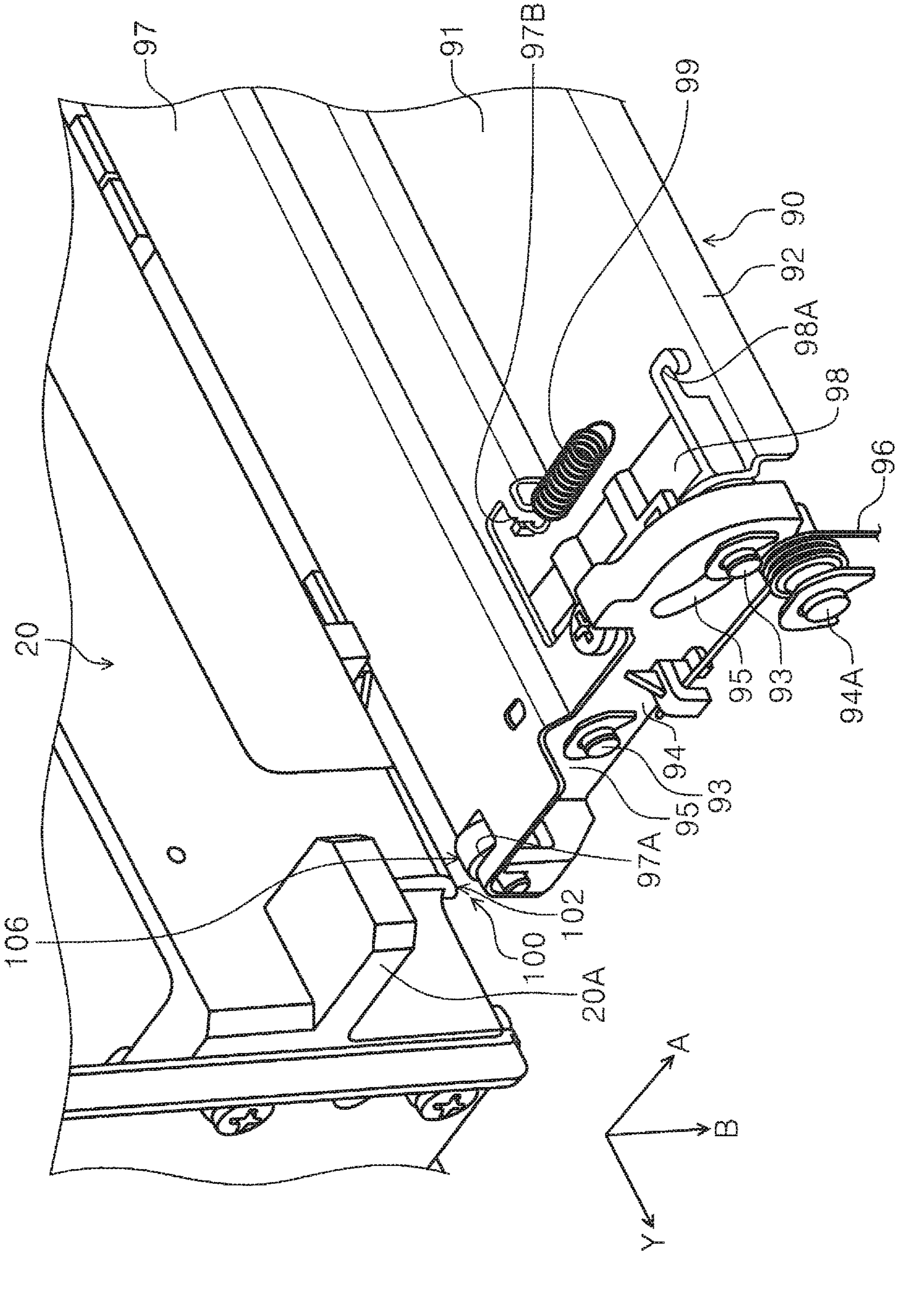
FIG. 12 is an enlarged perspective view of end portions of the line head and the lid unit according to Embodiment 1.

As illustrated in FIG. 12, the brackets 98 are fixed on a surface in the −B direction at both end portions of the plate-shaped portion 91 in the Y direction. A hook portion 98A is formed at an end portion in the +A direction of the bracket 98.

One end portion of the tension spring 99 is hooked on the hook portion 97B. Additionally, the other end portion of the tension spring 99 is hooked on the hook portion 98A, even though the tension spring 99 and the hook portion 98A are separated from each other in FIG. 12. With this, the plate-shaped portion 91 is biased toward the −A direction. In other words, the plate-shaped portion 91 is biased such that the pin portions 93 enter the second groove portions 95B (see FIG. 11). Moreover, when the cap portion 64 covers the nozzles N, the lid unit 90 assumes the closed posture in which the lid unit 90 covers the flushing portion 66.

The rotation mechanism portion 100 illustrated in FIG. 12 is a mechanism portion configured to rotate the lid unit 90 about the rotation axis G that is the central axis of the support shaft portion 94A along the Y direction. Further, when the head moving unit 30 (see FIG. 3) moves the line head 20 from the recording position to be described later to the retreat position, the rotation mechanism portion 100 rotates the lid unit 90 so that the posture of the lid unit 90 becomes the closed posture.

Specifically, the rotation mechanism portion 100 includes a portion to be contacted 102 provided in the line head 20, and a contact portion 106 provided in the lid unit 90 and configured to change a contact position with the portion to be contacted 102 along with a moving operation of the line head 20 to the recording position to rotate the lid unit 90.

When the line head 20 is at a rising position in the −B direction, the lid unit 90 is disposed along the A direction. When the line head 20 is at a lowering position in the +B direction, the lid unit 90 is inclined and disposed such that the contact portion 106 is located more in the −Z direction than the support shaft portion 94A with the support shaft portion 94A serving as a rotation axis.

Figure 13:
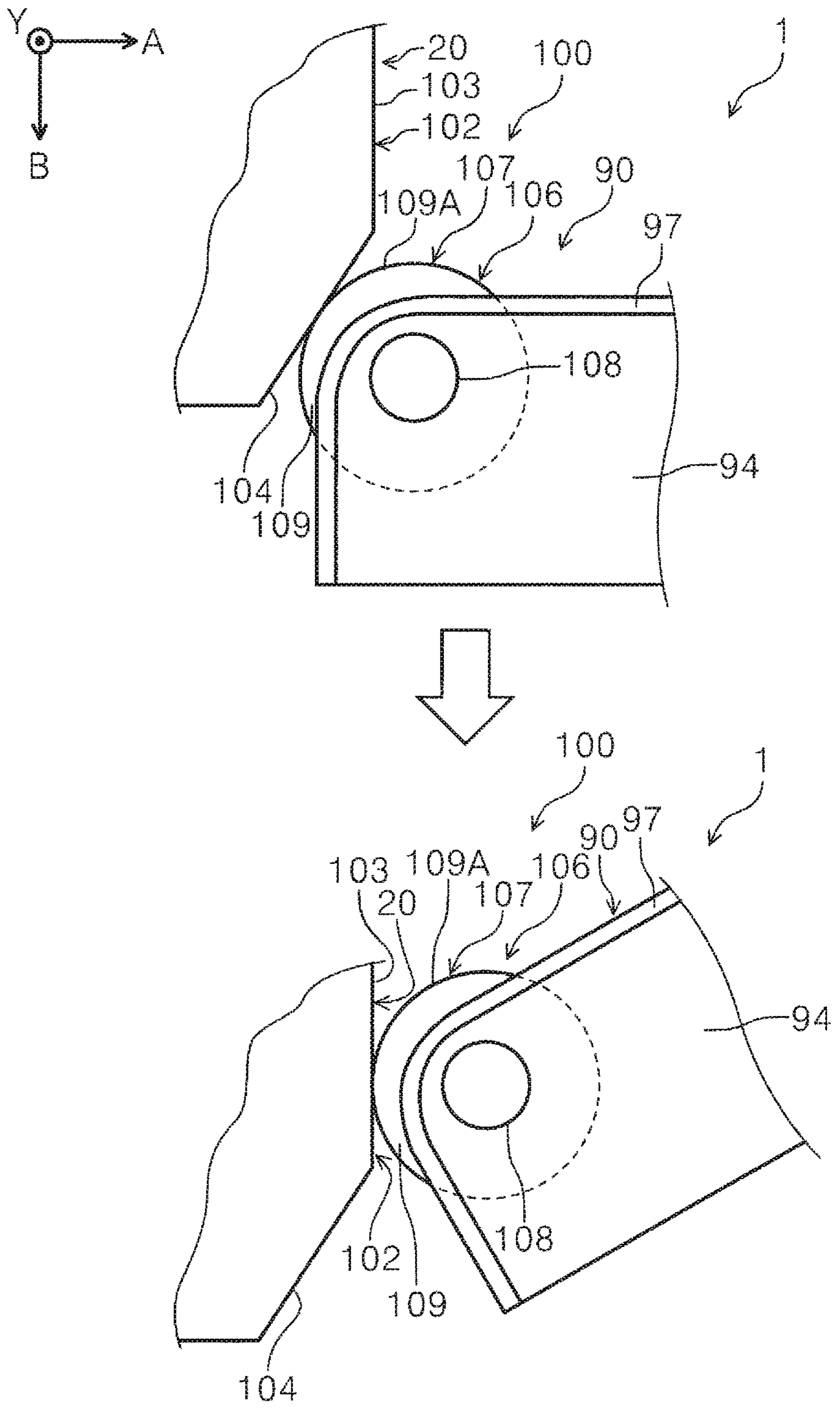
FIG. 13 is a diagram illustrating a state in which a roller of the lid unit according to Embodiment 1 is guided by a guide surface.

As illustrated in FIG. 13, the portion to be contacted 102 has a surface to be contacted 103 and a guide surface 104 that guides the contact portion 106 to the surface to be contacted 103.

The surface to be contacted 103 is formed as a side surface in the +A direction on the inside in the Y direction with respect to the plate portion 20A (see FIG. 12) of the line head 20. Further, the surface to be contacted 103 extends along the B direction when viewed in the Y direction. Further, the surface to be contacted 103 overlaps the contact portion 106 when viewed from the B direction in a state where the line head 20 is located at the retreat position, which will be described later.

The guide surface 104 is formed in the +B direction on a side where the transport unit 10 (see FIG. 1) is located with respect to the surface to be contacted 103, in the B direction. Further, the guide surface 104 is an inclined surface that extends in a direction intersecting both the A direction and the B direction when viewed from the Y direction. Further, the guide surface 104 overlaps the contact portion 106 when viewed from the B direction in a state where the line head 20 is located at the retreat position, which will be described later.

The contact portion 106 is configured of, for example, a rotating member 107. The rotating member 107 has a shaft portion 108 having a columnar shape and extending in the Y direction, and an annular portion 109 projecting in a radial direction from a central portion of the shaft portion 108 in the Y direction.

The shaft portion 108 is rotatably provided on the side plates 94 with the Y direction serving as an axial direction.

The annular portion 109 protrudes outward from the cutout portion 97A (see FIG. 12) of the cover member 97. Further, an outer peripheral surface 109A of the annular portion 109 is aligned in the B direction with the portion to be contacted 102 when viewed from the Y direction in a state where the line head 20 is located at the retreat position, which will be described later.

The rotating member 107 rotates by contact with the surface to be contacted 103 and contact with the guide surface 104.

The respective positions in the B direction when the line head 20 illustrated in FIG. 2 is moved by the head moving unit 30 will be described.

Figure 14:
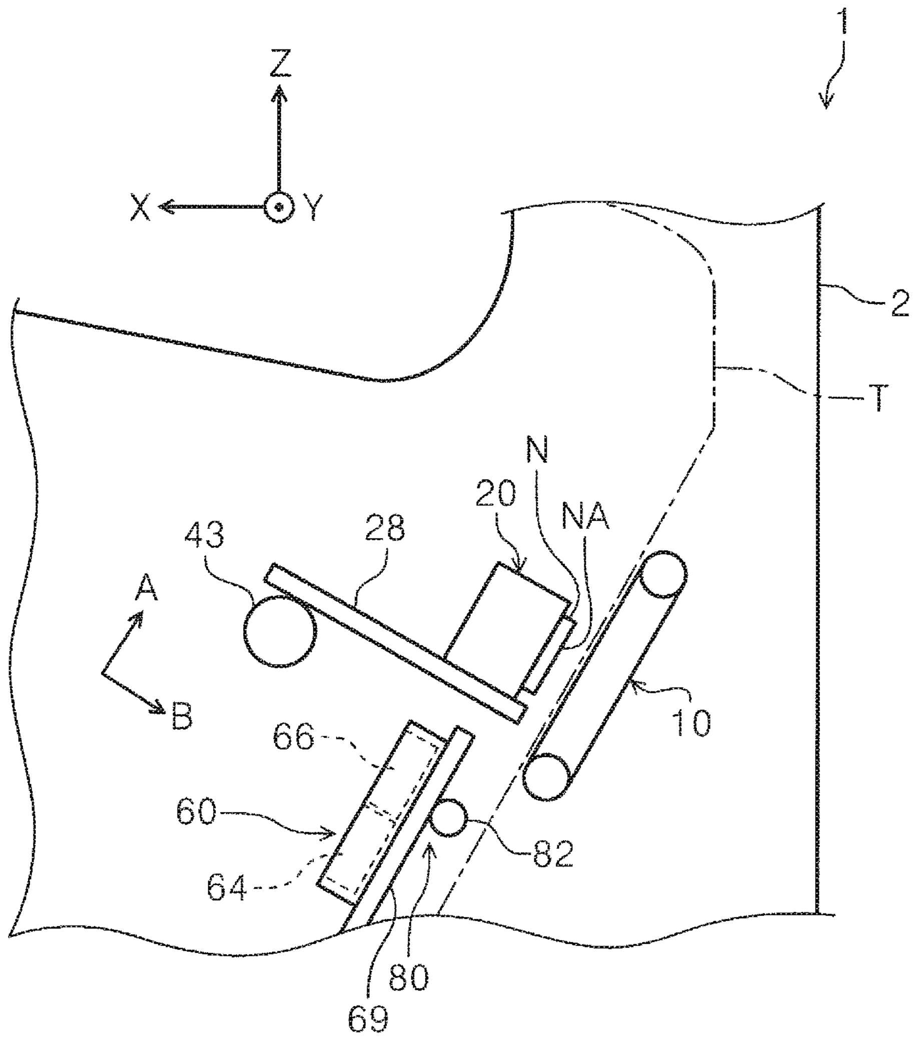
FIG. 14 is a schematic diagram illustrating a state in which the line head according to Embodiment 1 is located at a recording position.

As illustrated in FIG. 14, the recording position of the line head 20 means a stop position of the line head 20 when information can be recorded on the medium P by the line head 20. Note that, since the recording position is adjustable by the adjustment unit 46, one or more recording positions exist.

The retreat position of the line head 20 means a stop position of the line head 20 when the line head 20 is separated in the −B direction from the transport unit 10, compared with the recording position. The retreat position of the line head 20 includes the first position, the second position, the third position, the standby position, and the replacement position, which will be described later.

Figure 15:
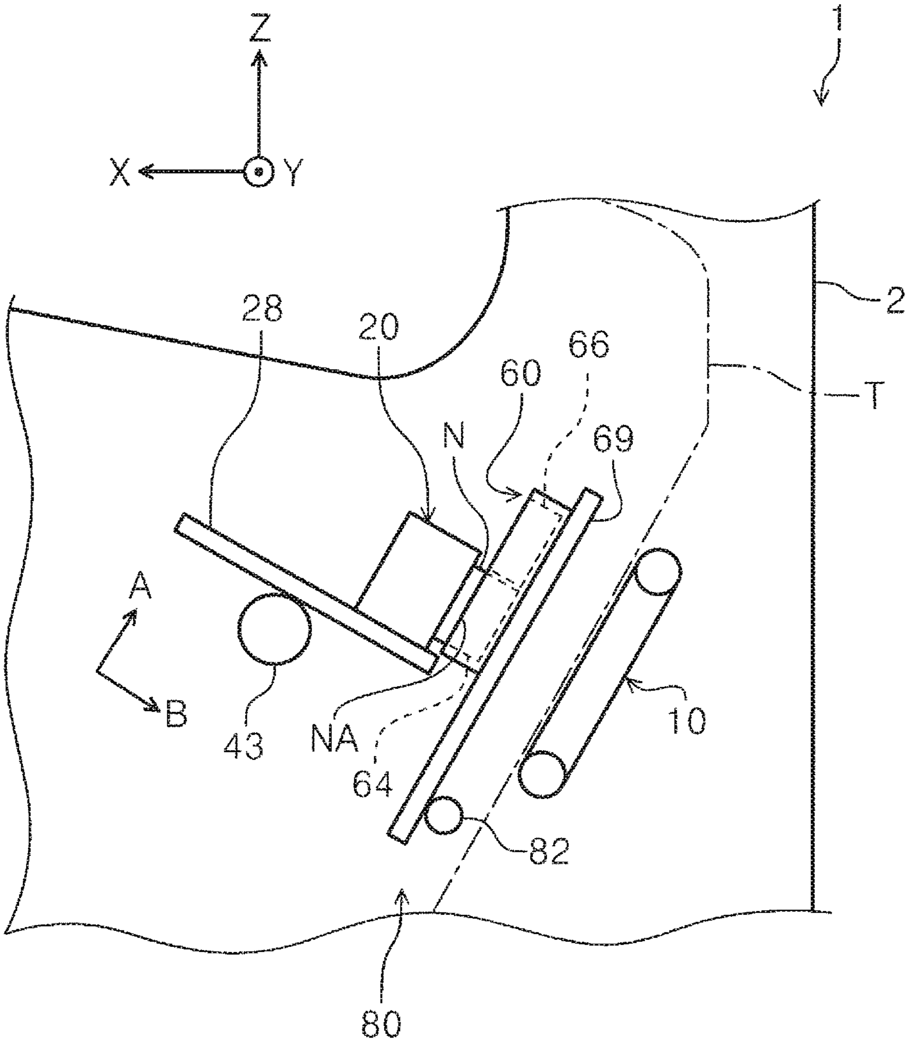
FIG. 15 is a schematic diagram illustrating a state in which the line head according to Embodiment 1 is located at a first position.

As illustrated in FIG. 15, the first position of the line head 20 means a position of the line head 20 when the cap portion 64 covers the nozzles N in the B direction.

Figure 16:
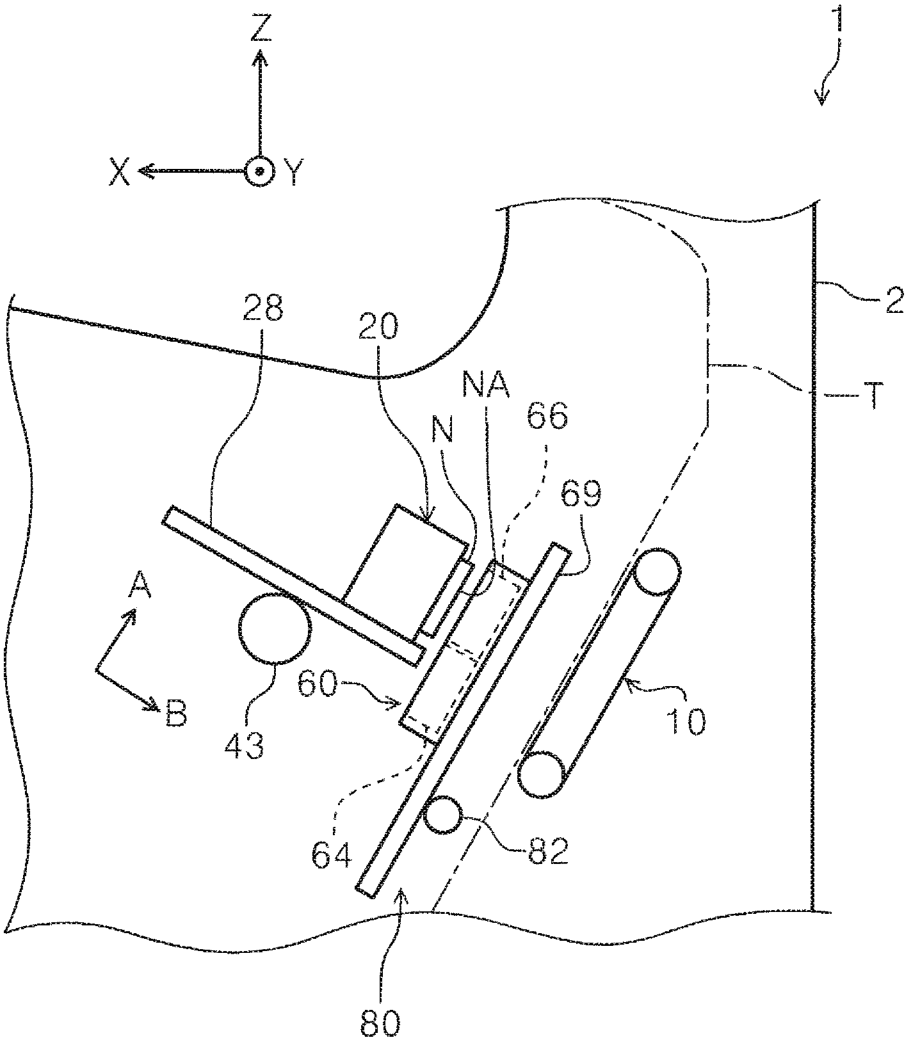
FIG. 16 is a schematic diagram illustrating a state in which the line head according to Embodiment 1 is located at a second position.

As illustrated in FIG. 16, the second position of the line head 20 means a position of the line head 20 when the flushing portion 66 faces the nozzles N so as to be more apart from the nozzles N than the first position in the B direction. Note that, at the second position, the flushing portion 66 may be separated from the nozzles N.

Figure 17:
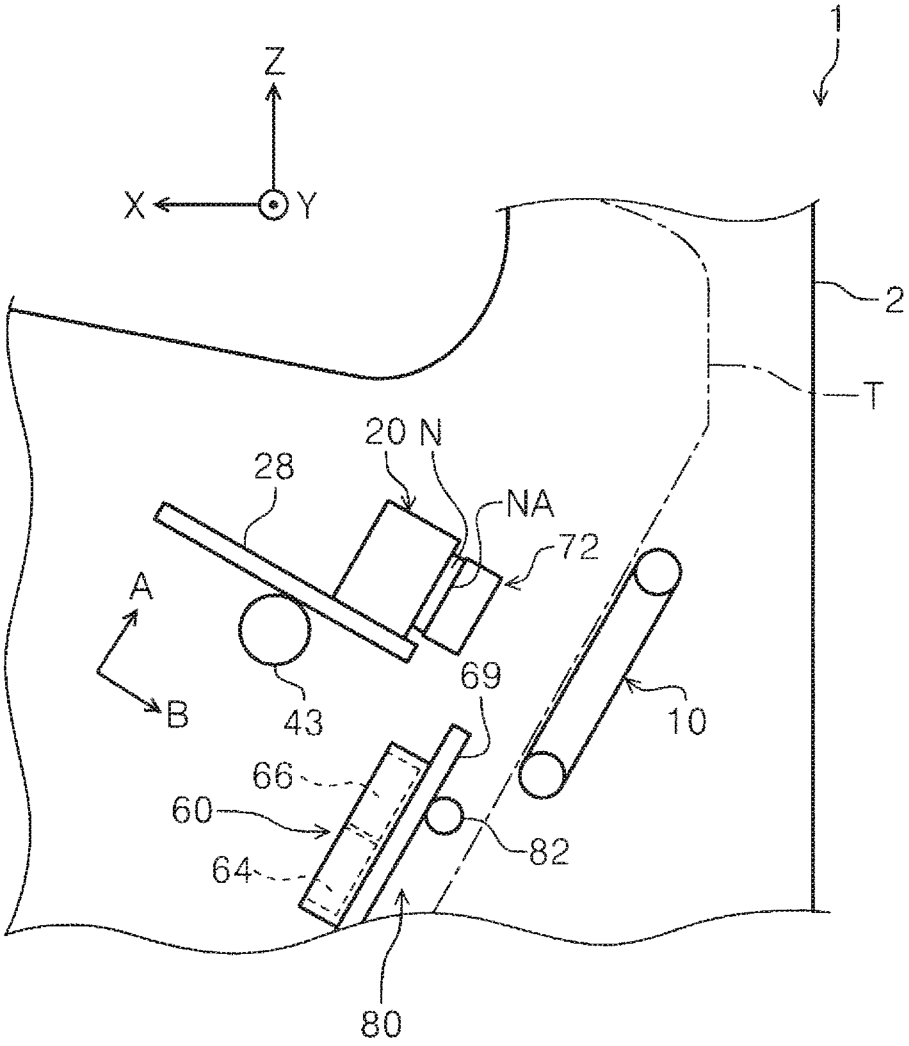
FIG. 17 is a schematic diagram illustrating a state in which the line head according to Embodiment 1 is located at a third position.

As illustrated in FIG. 17, the third position of the line head 20 means a position of the line head 20 when the second maintenance unit 72 can clean the ejecting surface NA of the nozzles N in the B direction.

Figure 18:
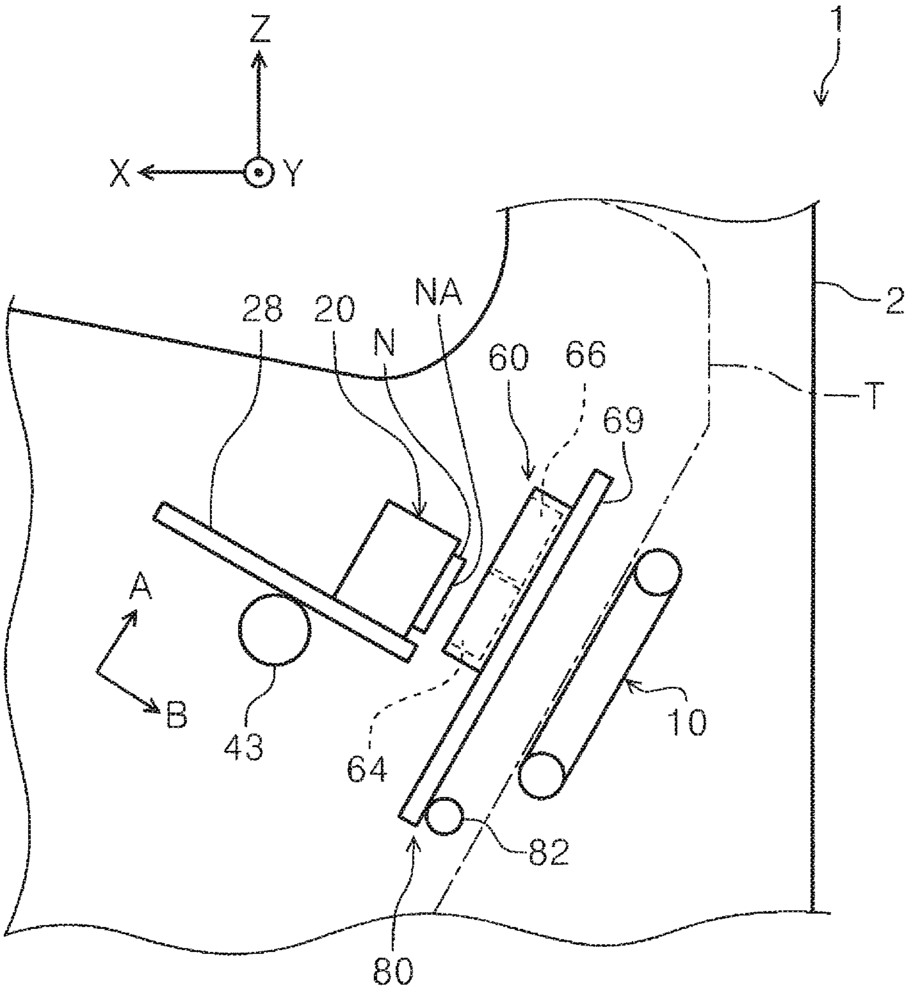
FIG. 18 is a schematic diagram illustrating a state in which the line head according to Embodiment 1 is located at a standby position before storage.
Figure 19:
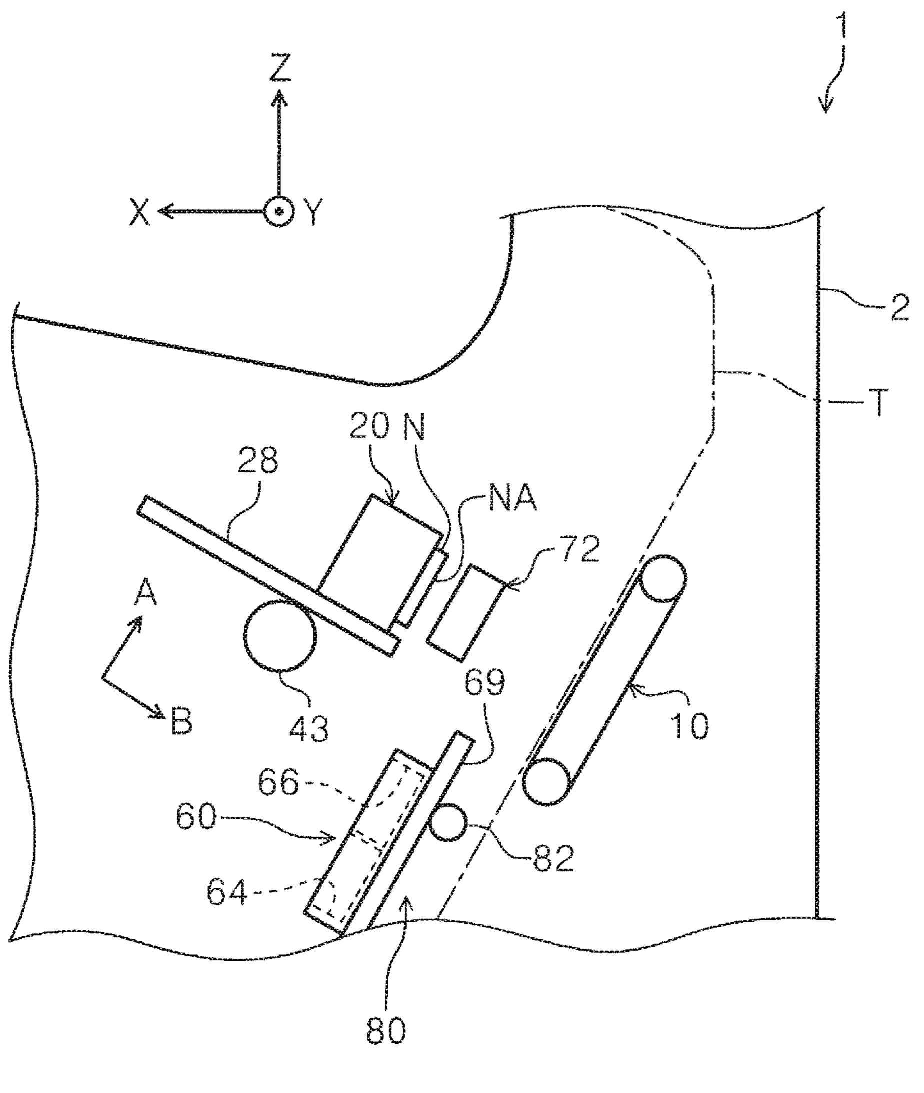
FIG. 19 is a schematic diagram illustrating a state in which the line head according to Embodiment 1 is located at a standby position before wiping.

As illustrated in FIG. 18 and FIG. 19, the standby position of the line head 20 means a position at which the line head 20 is more apart from the transport unit 10 than the first position, the second position, and the third position in the B direction. This is the standby position at which the line head 20 stands by until completion of the movement when the cap portion 64, the flushing portion 66, and the second maintenance unit 72 move.

Figure 20:
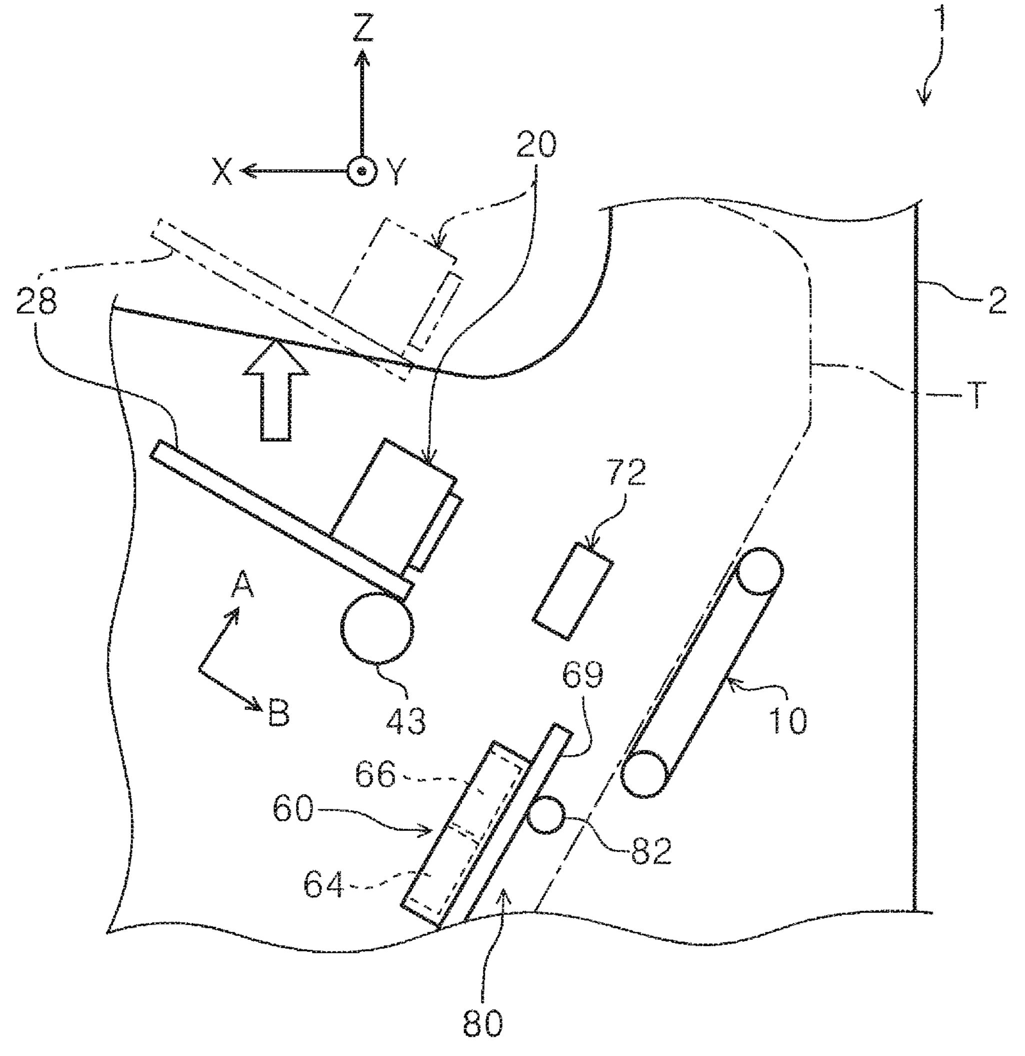
FIG. 20 is a schematic diagram illustrating a state in which the line head according to Embodiment 1 is located at a replacement position.

As illustrated in FIG. 20, the replacement position of the line head 20 means a position at which the line head 20 is more apart from the transport unit 10 than the standby position in the B direction. In other words, the replacement position of the line head 20 is a position farthest from the transport unit 10 in the B direction.

As described above, as an example, the head moving unit 30 is provided so as to be able to move the line head 20 to any one position of the recording position, the retreat position, the first position, the second position, the third position, the standby position, and the replacement position. Further, the head moving unit 30 is configured to cause the line head 20 to be located at the standby position before causing the line head 20 to be located at any one of the first position, the second position, and the third position.

1. As illustrated in FIG. 2, according to the printer 1, the head moving unit 30 moves the line head 20 in the B direction. Gravity acting in the Z direction on the line head 20 is resolved into a component force along the B direction and a component force along the A direction orthogonal to the B direction. Here, when the component force acting on the line head 20 in the B direction becomes smaller than the gravity acting on the line head 20 in the Z direction, a force required for moving the line head 20 decreases, and thus, an increase in load acting on the head moving unit 30 can be suppressed, as compared to a configuration in which the line head 20 is moved in the Z direction.

2. As illustrated in FIG. 1, in a region where the line head 20 performs recording on the medium P, when a length of the transport path T of the medium P is the same, and installation areas of the transport path T are compared, a width required in the horizontal direction of the printer 1 is smaller than that in a case where the A direction is the horizontal direction. Further, a height required in the vertical direction is lower than that in the case where the A direction is the vertical direction. In this way, the printer 1 can be reduced in size both in the horizontal direction and in the vertical direction.

3. As illustrated in FIG. 6, according to the printer 1, since the plurality of recording positions is provided along the B direction and the adjustment unit 46 configured to adjust the recording positions is included, the line head 20 can be located at a more appropriate position according to a thickness of the medium P.

4. As illustrated in FIG. 1, according to the printer 1, since the line head 20 and the discharge tray 21 can be arranged close to each other, a size of the printer 1 in the Z direction can be reduced.

5. As illustrated in FIG. 2, according to the printer 1, since the first angle θ1 is larger than the second angle θ2, the line head 20 moved in a direction away from the recording position approaches the discharge tray 21, and thus the line head 20 can be moved to a peripheral portion of the discharge tray 21. Here, since a space portion is present in the peripheral portion of the discharge tray 21 in order to take out the medium P from the discharge tray 21, an operation (for example, a replacement operation) can be performed on the line head 20 through the space portion, and since the line head 20 approaches the space portion during the operation, the operation can be easily performed.

6. As illustrated in FIG. 15, according to the printer 1, when the line head 20 is located at the retreat position, the maintenance unit 60 is advanced between the line head 20 and the transport unit 10. Then, the maintenance unit 60 performs maintenance of the line head 20. As described above, since the maintenance unit 60 performs the maintenance of the line head 20, drop-off of the line head 20 to the maintenance unit 60 can be suppressed during the maintenance.

7. As illustrated in FIG. 15, according to the printer 1, in a state in which the head moving unit 30 moves the line head 20 to the first position, the first maintenance unit 62 is advanced, so that the cap portion 64 covers the nozzles N.

In addition, as illustrated in FIG. 16, the first maintenance unit 62 is advanced in a state where the head moving unit 30 moves the line head 20 to the second position, so that the flushing portion 66 covers the nozzles N. The ink ejected from the nozzles N in this state is received by the flushing portion 66.

Further, as illustrated in FIG. 17, in a state where the head moving unit 30 moves the line head 20 to the third position, the second maintenance unit 72 is advanced, so that the blade 76 can clean the ejecting surface NA of the nozzles N. In this state, the ejecting surface NA of the nozzles N is cleaned by the blade 76.

As described above, since the position of the line head 20 changes according to the cap portion 64, the flushing portion 66, and the blade 76, appropriate maintenance for the line head 20 can be performed, compared to a configuration in which the position of the line head 20 is set at the same position regardless of the maintenance unit 60.

8. As illustrated in FIG. 18 and FIG. 19, according to the printer 1, before causing the line head 20 to be located at any one of the first position, the second position, and the third position, the head moving unit 30 causes the line head 20 to be located at the standby position. Accordingly, when the maintenance unit 60 advances, it becomes possible to form a gap between the line head 20 and the maintenance unit 60, and thus it is possible to prevent the maintenance unit 60 from moving in contact with the line head 20.

9. As illustrated in FIG. 20, according to the printer 1, since the line head 20 is replaced at the replacement position farthest from the transport path T of the medium P, it is possible to suppress a stain on the transport path T of the transport unit 10 and the medium P due to a recording material such as ink during a replacement operation of the line head 20.

Figure 21:
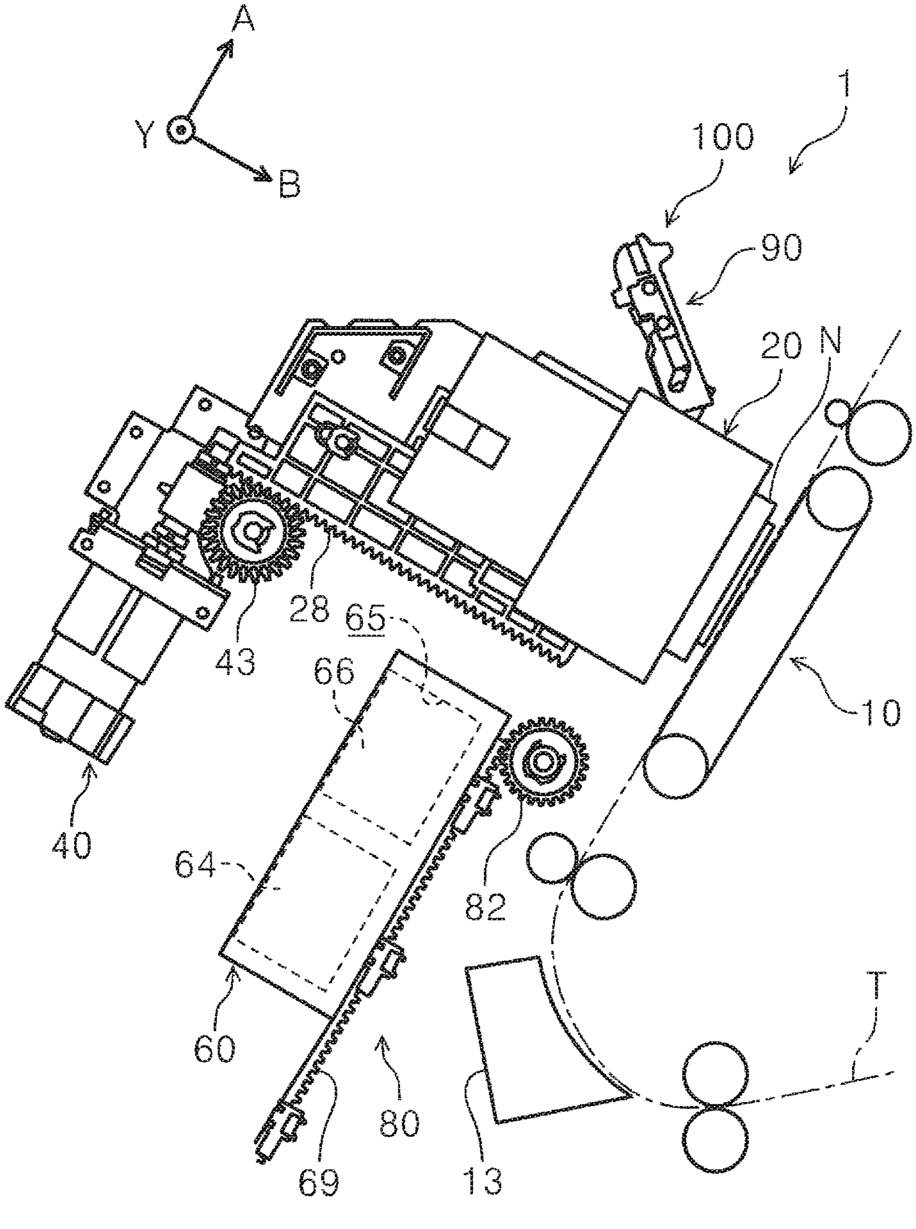
FIG. 21 is a schematic diagram illustrating arrangement of respective portions when the line head according to Embodiment 1 is located at the recording position.

As illustrated in FIG. 21, the lid unit 90 is disposed in a non-use posture in which a portion serving as a free end is directed and positioned toward the transport unit 10 by restricting the rotation to the closed posture by the line head 20 when the line head 20 is at the recording position. At this time, the rotating member 107 (see FIG. 13) is in contact with the surface to be contacted 103 (see FIG. 13).

Figure 22:
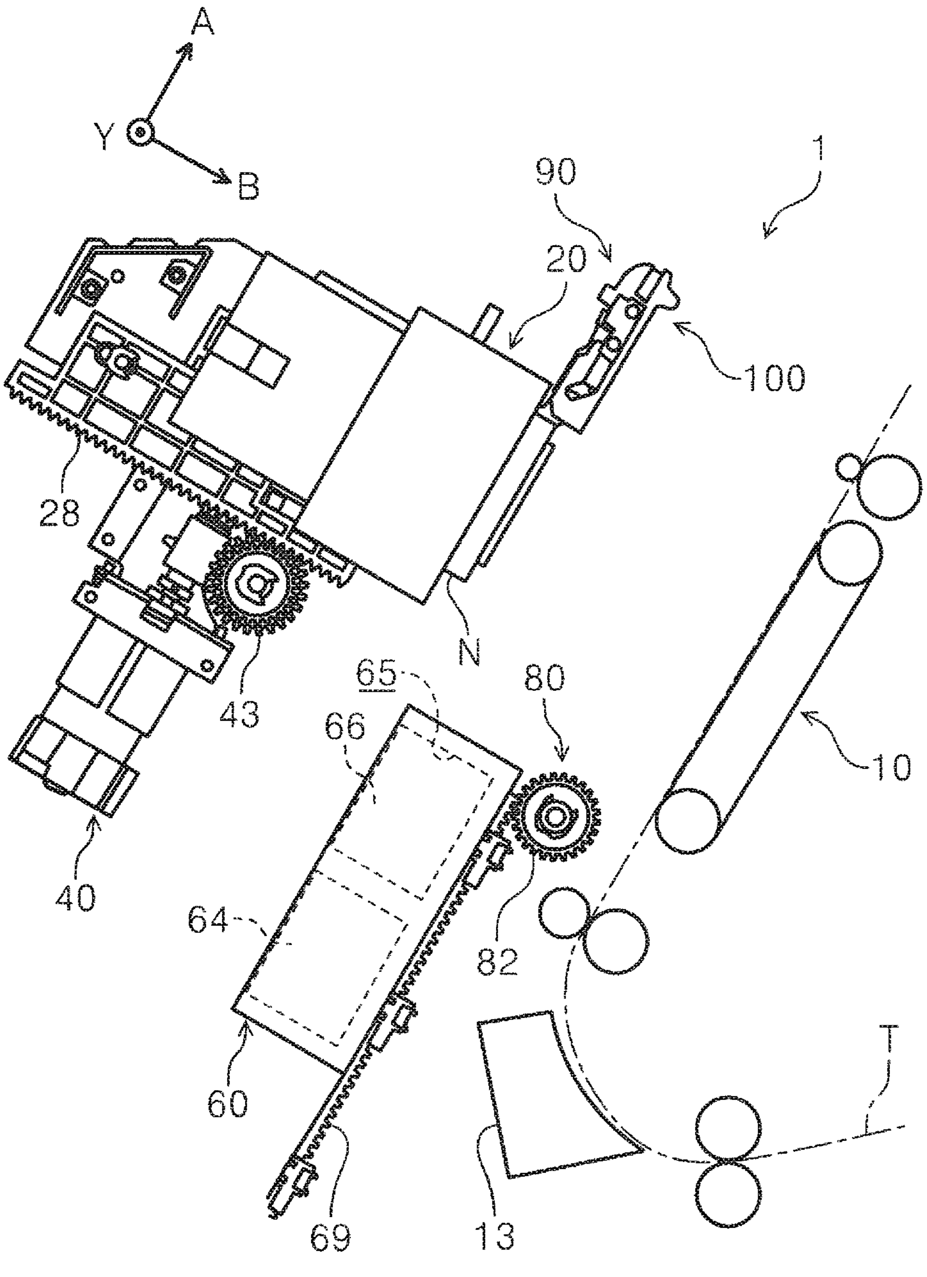
FIG. 22 is a schematic diagram illustrating arrangement of respective portions when the line head according to Embodiment 1 is located at a retreat position.

As illustrated in FIG. 22, the lid unit 90 assumes the closed posture when the line head 20 moves to the retreat position, and is disposed along the A direction. In this state, the maintenance unit 60 is moved in the +A direction.

Figure 23:
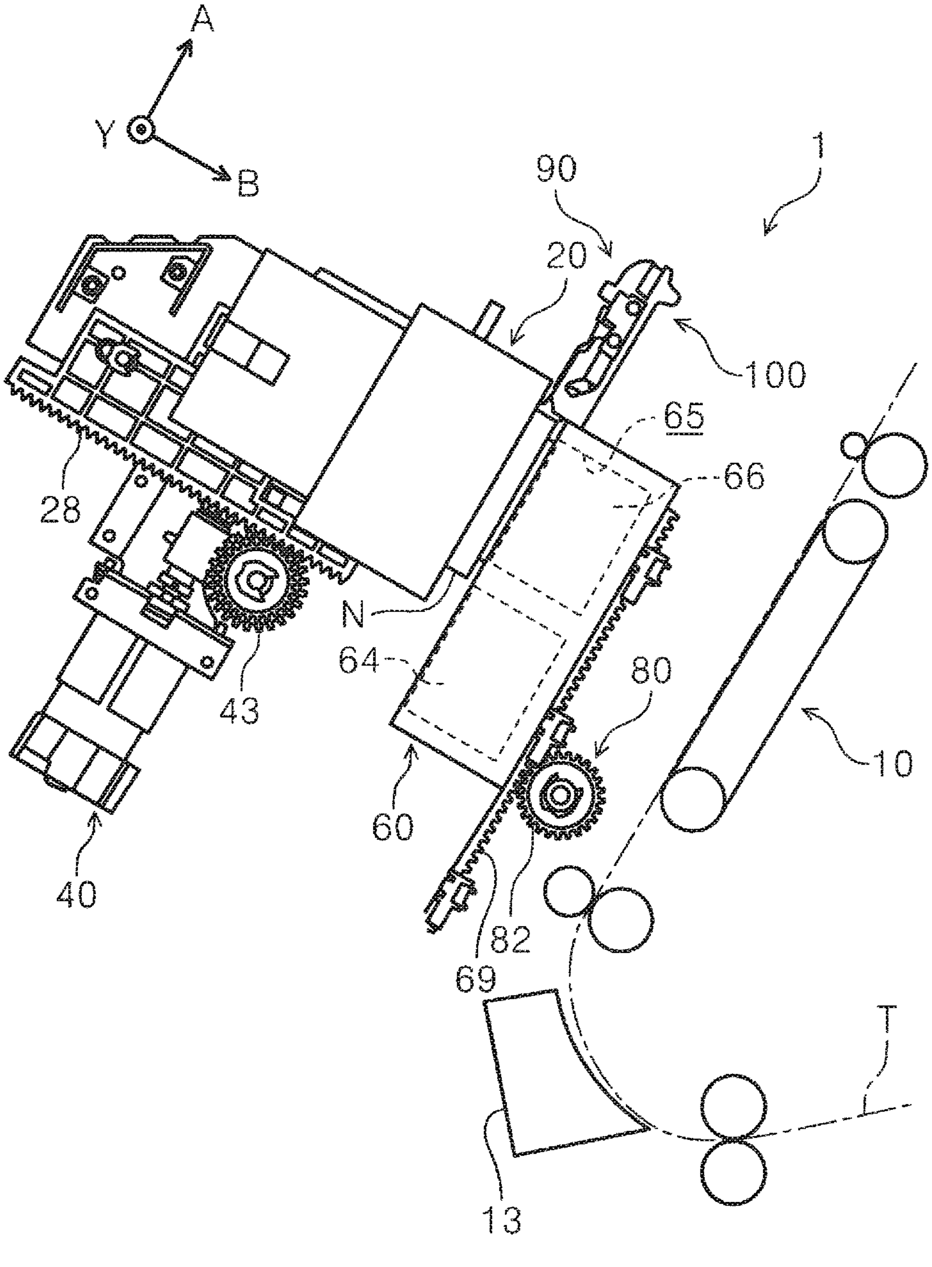
FIG. 23 is a schematic diagram illustrating arrangement of respective portions when the line head according to Embodiment 1 performs flushing.

As illustrated in FIG. 23, the lid unit 90 is held in the closed posture in a state in which the flushing portion 66 faces the nozzles N.

Figure 24:
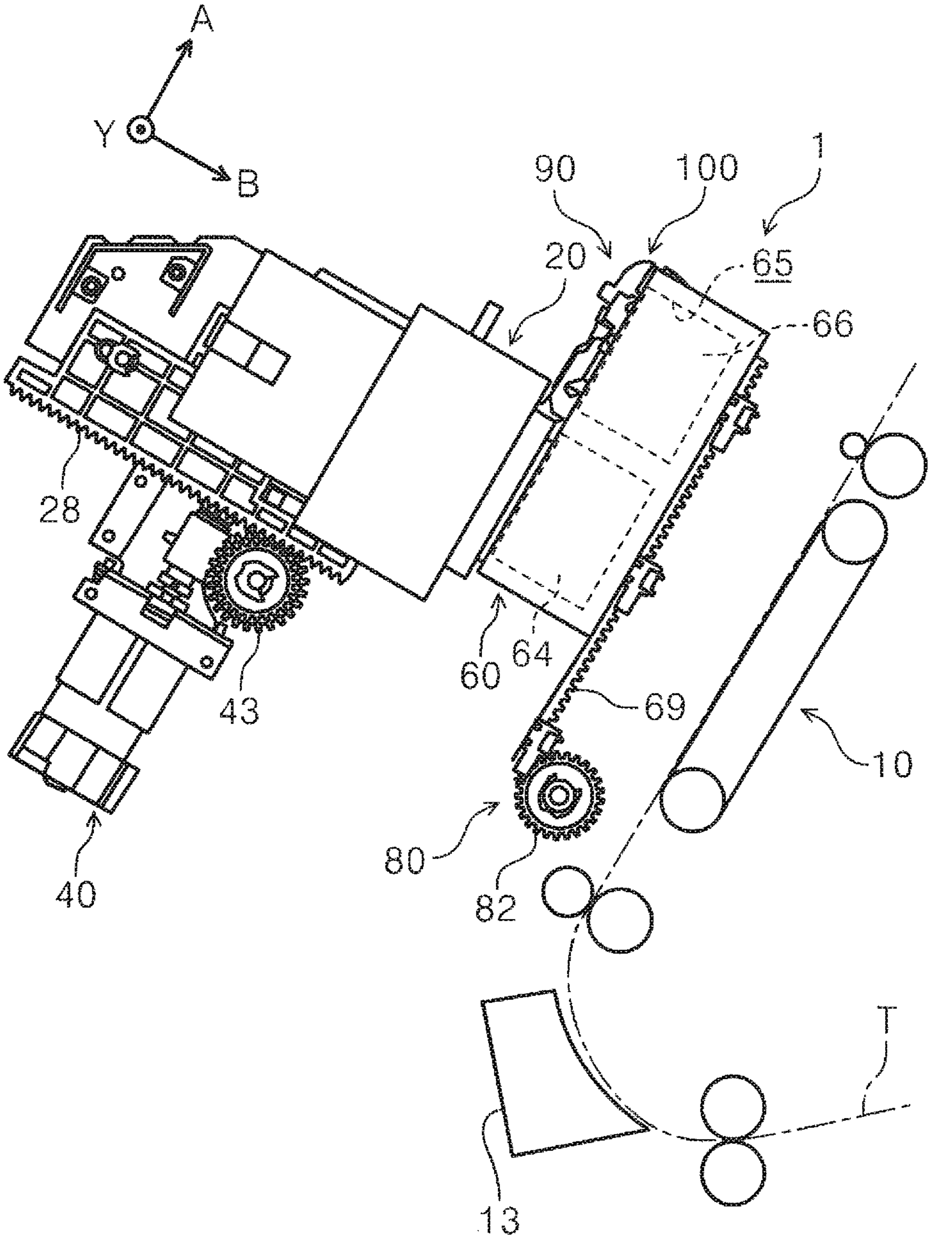
FIG. 24 is a schematic diagram illustrating arrangement of respective portions when the line head according to Embodiment 1 is in a storage state.

As illustrated in FIG. 24, the lid unit 90 closes the flushing portion 66 by covering the flushing portion 66 from the −B direction in a state where the maintenance unit 60 is moved in the +A direction and the cap portion 64 covers the nozzles N.

Figure 25:
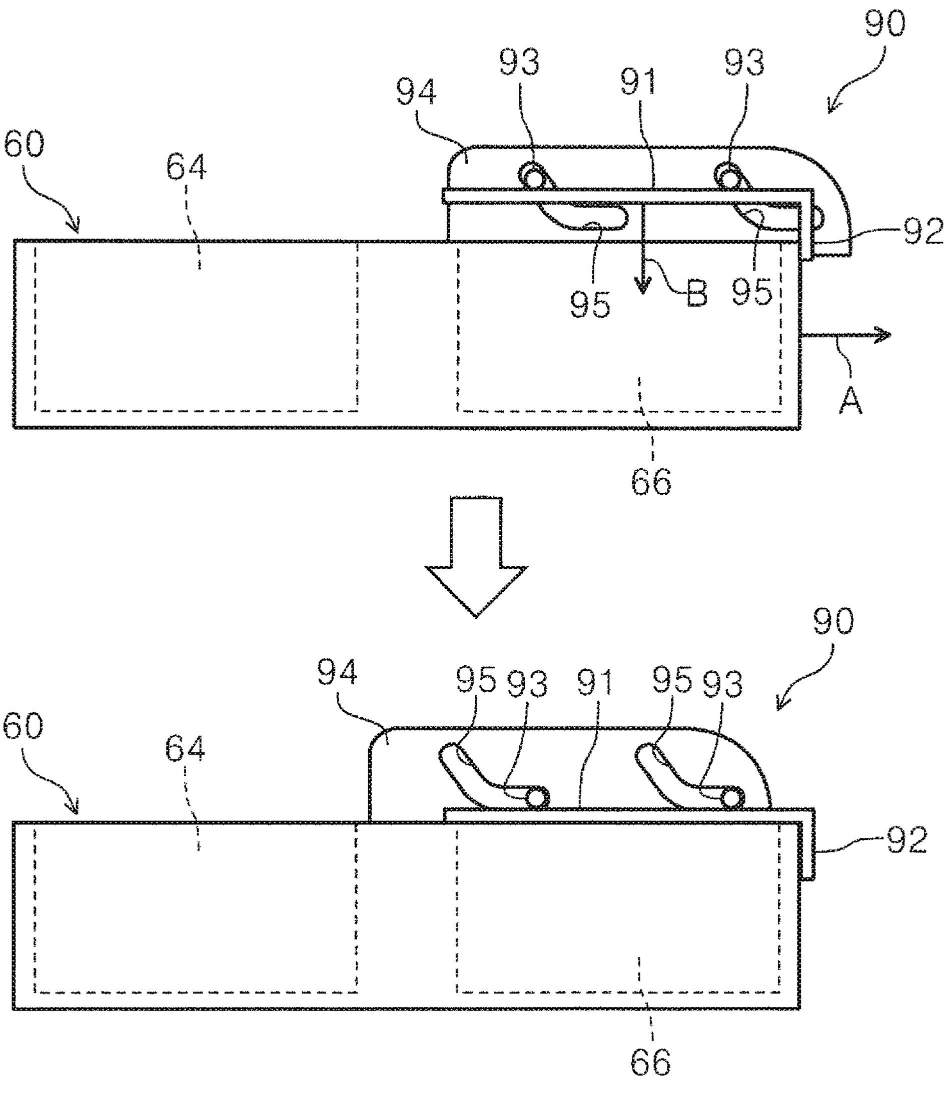
FIG. 25 is a schematic diagram illustrating a state in which a plate-shaped portion of the lid unit according to Embodiment 1 is displaced with the movement of the maintenance unit.

As illustrated in FIG. 25, specifically, the maintenance unit 60 moves in the +A direction and comes into contact with the projecting portion 92, so that the projecting portion 92 is moved in the A direction. The plate-shaped portion 91 is moved in the A direction along with the movement of the projecting portion 92 in the A direction. At this time, the pin portion 93 is guided by the guide groove 95, so that the plate-shaped portion 91 is moved toward the maintenance unit 60, and the flushing portion 66 is closed.

10. As illustrated in FIG. 21 to FIG. 25, according to the printer 1, when the head moving unit 30 moves the line head 20 from the recording position to the retreat position, the rotation mechanism portion 100 rotates the lid unit 90 so that the posture of the lid unit 90 becomes the closed posture. Then, when the maintenance unit 60 is moved in the A direction, the cap portion 64 covers the nozzles N, and the lid unit 90 closes the opening 65. As described above, since the lid unit 90 is configured to be rotated, enlargement in size of the printer 1 can be suppressed in a sliding direction of the lid unit 90, compared with a configuration in which the lid unit 90 is slid.

11. According to the printer 1, in the configuration in which the maintenance unit 60 has the cap portion 64 and the flushing portion 66, when the cap portion 64 covers the nozzles N, the lid unit 90 covers the flushing portion 66, and thus it is possible to suppress drying of the flushing portion 66.

12. According to the printer 1, when the maintenance unit 60 is at the standby position, the flushing portion 66 is at a position closer to the line head 20 than the cap portion 64. As a result, when ink is ejected from the nozzles N to the flushing portion 66 in the middle of a recording job, the time for moving the maintenance unit 60 becomes shorter, and therefore, it is possible to suppress a decrease in recording throughput.

13. As illustrated in FIG. 13, according to the printer 1, the contact portion 106 changes the contact position with the portion to be contacted 102 along with the moving operation of the line head 20, so that the lid unit 90 is rotated. That is, since a drive source for rotating the lid unit 90 may not be separately provided, and an installation space for the drive source may not be secured, it is possible to suppress an increase in size of the printer 1.

14. According to the printer 1, the contact portion 106 is guided to the surface to be contacted 103 by coming into contact with the guide surface 104, and thus it is possible to suppress that the contact portion 106 is caught by the portion to be contacted 102.

Further, since the rotating member 107 moves while being rotated by contact with the portion to be contacted 102, a frictional force generated by contact between the contact portion 106 and the portion to be contacted 102 can be reduced, as compared with a configuration in which the contact portion 106 does not include the rotating member 107.

15. As illustrated in FIG. 25, according to the printer 1, when the maintenance unit 60 is moved to a position where the maintenance unit 60 faces the lid unit 90 in the state where the lid unit 90 is in the closed posture along the A direction, the maintenance unit 60 presses the projecting portion 92 in the A direction, thereby moving the plate-shaped portion 91 in the B direction. Here, as the plate-shaped portion 91 moves, the two pin portions 93 are guided by the guide grooves 95, so that the plate-shaped portion 91 approaches the opening 65 and closes the opening 65. As described above, since the plate-shaped portion 91 configuring a part of the lid unit 90 and the opening 65 are brought close to each other without changing the posture of the lid unit 90, the lid unit 90 and the opening 65 are not rubbed with each other in the A direction, and formation of a gap can be suppressed in the B direction.

Next, a printer 110 according to Embodiment 2 as an example of the recording apparatus according to the present disclosure will be described. Note that portions common to the printer 1 according to Embodiment 1 (see FIG. 1) are denoted by the same reference signs, and description thereof will be omitted. Further, description of functions and effects similar to those in Embodiment 1 will be omitted.

Figure 26:
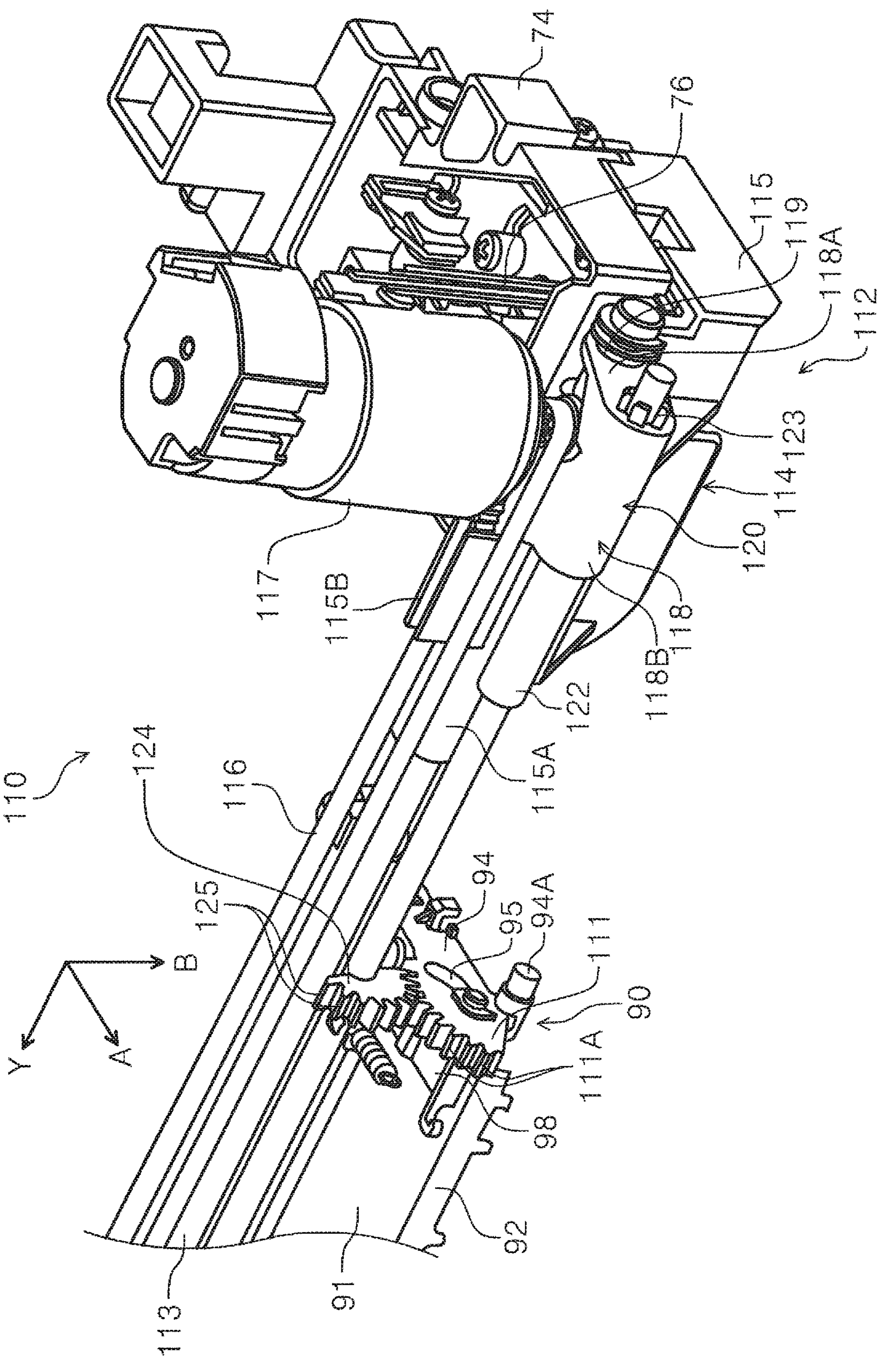
FIG. 26 is a perspective view illustrating a rotation mechanism portion of a lid unit of a printer according to Embodiment 2.

As illustrated in FIG. 26, the printer 110 is provided with a rotation mechanism portion 112 instead of the rotation mechanism portion 100 (see FIG. 13). A gear portion 111 is formed on the side plate 94 of the lid unit 90. The gear portion 111 is formed in the +A direction of the side plate 94 and in a direction opposite to the direction of the support shaft portion 94A with respect to the guide groove 95. The gear portion 111 has a plurality of tooth portions 111A. The plurality of tooth portions 111A is arranged in a circumferential direction with respect to a rotation center of the support shaft portion 94A. A guide shaft 113 extending in the Y direction is provided on a main body frame (not illustrated) of the printer 110.

The rotation mechanism portion 112 is provided so as to be movable in the Y direction, and includes a wiper portion 114 as an example of the cleaning portion configured to clean the ejecting surface NA (see FIG. 2) of the nozzles N, and a conversion portion 120 configured to convert a linear motion into a rotational motion.

The wiper portion 114 includes the main body portion 74, the blade 76, a support frame 115 configured to support the main body portion 74, an endless belt 116, and a motor 117.

The support frame 115 is formed with a cylindrical portion 115A that opens in the Y direction and a pinching portion 115B that pinches a part of the belt 116. The cylindrical portion 115A is guided in the Y direction by the guide shaft 113.

The belt 116 is formed with a plurality of tooth portions on its inner surface, and by rotating a gear engaging with the tooth portions by the motor 117, the belt 116 is rotated and moved.

The pinching portion 115B is linearly moved in the Y direction along with the rotation movement of the belt 116 by pinching the part of the belt 116.

As described above, the main body portion 74, the blade 76, and the support frame 115 are integrally formed, and are movable in the Y direction by the rotation of the motor 117.

The conversion portion 120 includes the gear portion 111 of the side plate 94, a cylindrical member 118, a shaft member 122, which will be described later, and a gear portion 124.

The cylindrical member 118 has a portion to be guided 118A having a plate shape and a cylindrical portion 118B integrated with the portion to be guided 118A. A through-hole 119 is formed in the portion to be guided 118A. The guide shaft 113 is inserted into the through-hole 119. That is, the cylindrical member 118 is movable in the Y direction along the guide shaft 113. A protrusion (not illustrated) protruding inward in a radial direction is formed inside the cylindrical portion 118B.

The cylindrical portion 118B is configured separately from and independently of the wiper portion 114, is movable in the Y direction along the shaft member 122, and is pressed in the +Y direction by a spring (not illustrated). Further, the cylindrical portion 118B is configured to be engageable with the wiper portion 114.

The shaft member 122 is a columnar member, and extends in the Y direction. In addition, the shaft member 122 is rotatably supported by a bracket (not illustrated). A cam groove 123 having a spiral shape is formed on an outer peripheral surface of a portion of the shaft member 122 in the −Y direction with respect to the center in the Y direction of the shaft member 122. The protrusion (not illustrated) formed inside the cylindrical portion 118B is inserted into the cam groove 123.

A gear portion 124 having a semicircular shape is formed in a portion of the shaft member 122 in the +Y direction with respect to the center in the Y direction of the shaft member 122. The gear portion 124 has a plurality of tooth portions 125. The plurality of tooth portions 125 is engaged with the plurality of tooth portions 111A.

When the cylindrical member 118 moves in the Y direction, the protrusion (not illustrated) formed inside the cylindrical portion 118B moves in the cam groove 123 that has the spiral shape and that is formed in the shaft member 122, and thus the shaft member 122 rotates. When the shaft member 122 rotates, the lid unit 90 rotates.

Here, the wiper portion 114 has a home position at an end portion in the −Y direction, and when the wiper portion 114 is at the home position, the wiper portion 114 pushes the cylindrical member 118 in the −Y direction, and whereby the lid unit 90 assumes the closed posture (see FIG. 22). When the wiper portion 114 moves in the +Y direction from this state, the cylindrical member 118 moves together with the wiper portion 114 in the +Y direction, as illustrated by the change from FIG. 26 to FIG. 27, by a spring (not illustrated).

As a result, the shaft member 122 rotates, and the wiper portion 114 switches to the non-use posture (see FIG. 21).

As described above, the conversion portion 120 is configured to convert the linear motion along the Y direction of the wiper portion 114 into the rotational motion for rotating the lid unit 90.

Figure 27:
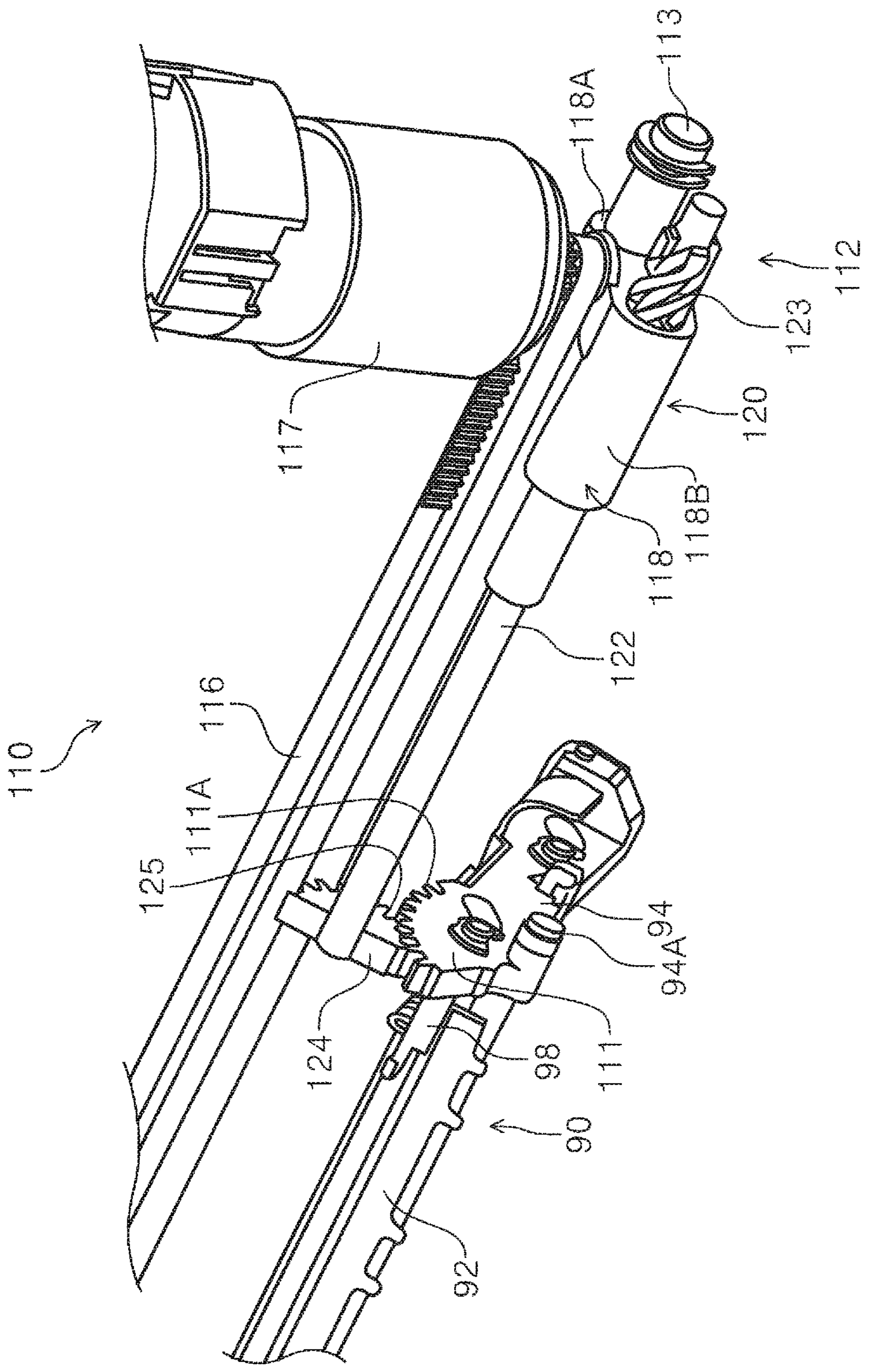
FIG. 27 is a perspective view illustrating a state in which the lid unit is rotated by the rotation mechanism portion according to Embodiment 2.

As illustrated in FIG. 26 and FIG. 27, when the wiper portion 114 is moved in the Y direction after cleaning the nozzles N (see FIG. 1), the conversion portion 120 converts the linear motion of the wiper portion 114 into the rotational motion for rotating the lid unit 90. That is, since a drive source for rotating the lid unit 90 may not be separately provided, and an installation space for the drive source may not be secured, it is possible to suppress an increase in size of the printer 110. Note that, in FIG. 27, illustration of the wiper portion 114 (see FIG. 26) is omitted.

Next, a printer 130 according to Embodiment 3 as an example of the recording apparatus according to the present disclosure will be described. Note that portions common to the printer 1 (see FIG. 1) or the printer 110 (see FIG. 26) are denoted by the same reference signs, and description thereof will be omitted. Further, description of functions and effects similar to those in Embodiments 1 and 2 will be omitted.

Figure 28:
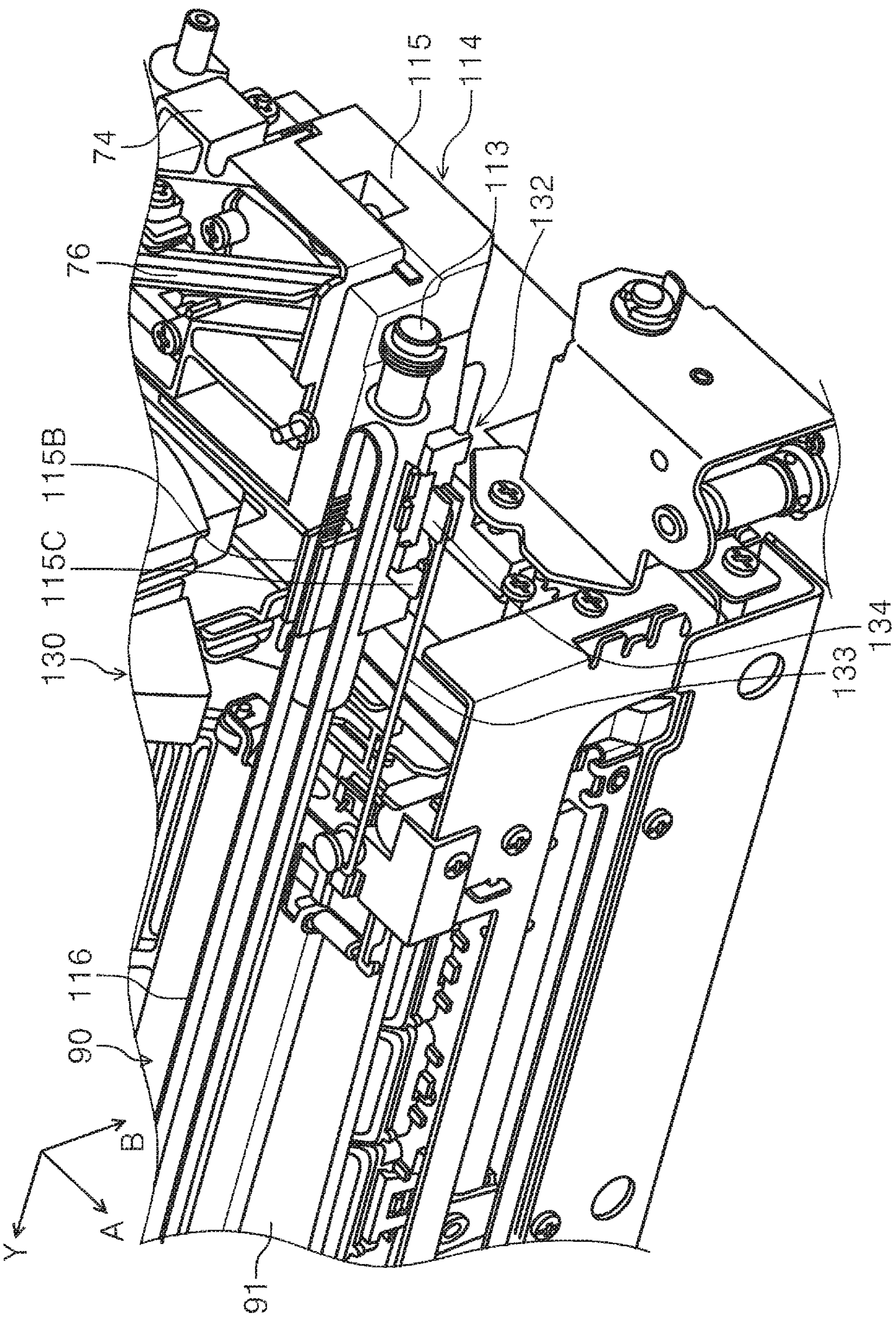
FIG. 28 is a perspective view illustrating a rotation mechanism portion of a lid unit of a printer according to Embodiment 3.

As illustrated in FIG. 28, the printer 130 is provided with a rotation mechanism portion 132 instead of the rotation mechanism portion 100 (see FIG. 13). Note that, in FIG. 28, illustration of the motor 117 (see FIG. 26) is omitted. In addition, a protruding portion 115C having a plate shape and protruding in the +A direction is formed on the support frame 115.

Figure 29:
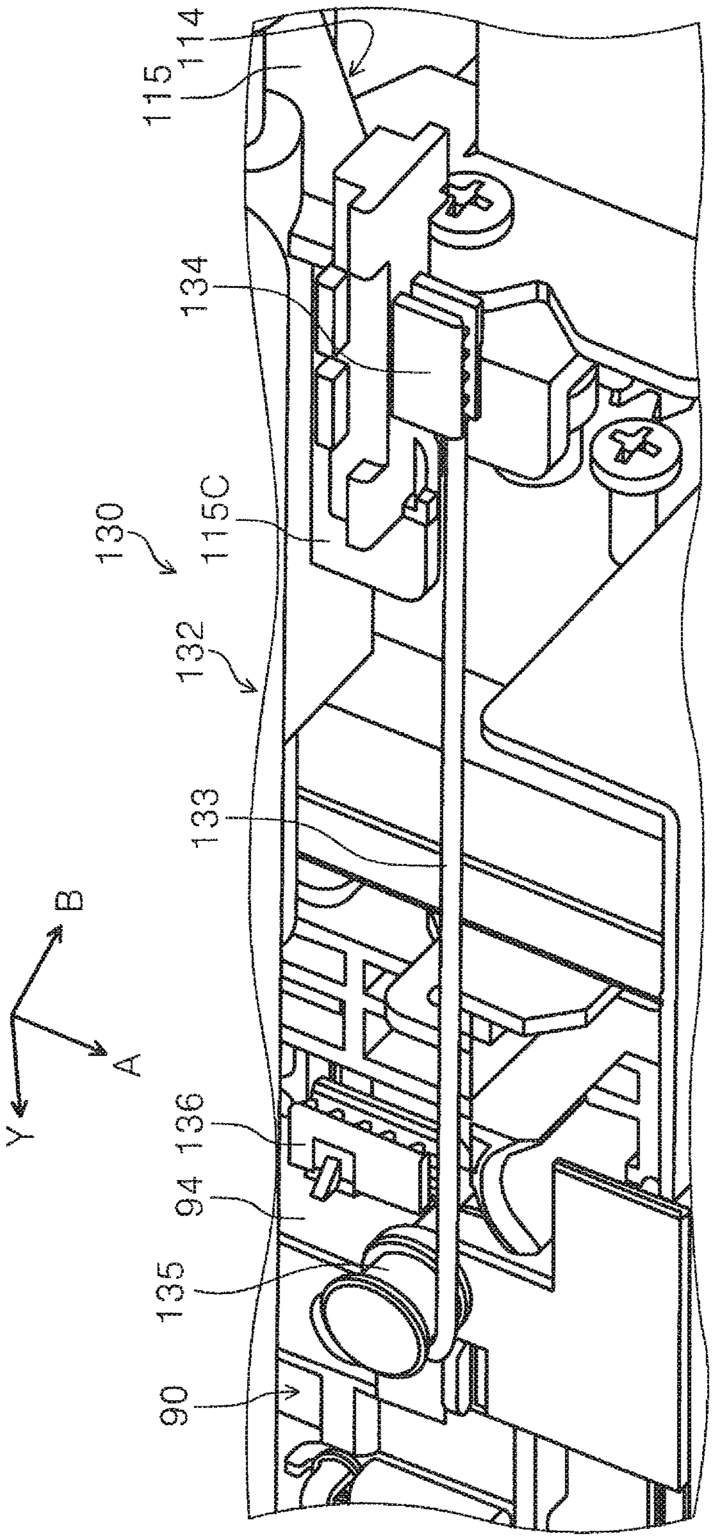
FIG. 29 is a partial enlarged view of FIG. 28.

As illustrated in FIG. 29, the rotation mechanism portion 132 includes a wire 133, a slide member 134, a winding portion 135, a hook portion (not illustrated), and a pinching portion 136.

The slide member 134 is supported by a bracket (not illustrated), and is movable in the Y direction. Further, the slide member 134 is disposed in the −Y direction with respect to the protruding portion 115C, and when the support frame 115 is moved toward a storage position in the −Y direction, the slide member 134 is moved in the −Y direction by coming into contact with the protruding portion 115C. Further, the slide member 134 pinches one end portion of the wire 133.

The winding portion 135 is a columnar portion having an axial direction in the B direction, and is rotatably provided by a bracket (not illustrated).

The hook portion (not illustrated) and the pinching portion 136 are formed on the side plate 94.

The wire 133 is extended in the Y direction in a state in which one end is pinched by the slide member 134, is wound around the winding portion 135, and is extended in the B direction. Further, the wire 133 is bent by hooking the portion extended in the B direction on the hook portion (not illustrated). Then, the other end of the wire 133 is pinched by the pinching portion 136. Note that the lid unit 90 is rotatable in a similar manner to that in Embodiment 1.

As described above, in the rotation mechanism portion 132, the wire 133 is pulled or loosened along with the movement of the wiper portion 114 in the Y direction, so that the lid unit 90 is rotated.

The state illustrated in FIG. 28 indicates a state where the wiper portion 114 is located slightly more in the +Y direction than the end portion in the −Y direction, that is, the home position. In this state, the wire 133 is loosened, and the lid unit 90 assumes the non-use posture (see FIG. 21) due to its own weight. From this state, when the wiper portion 114 moves in the −Y direction, the slide member 134 is pressed toward the −Y side by the protruding portion 115C, and moves in the −Y direction. Therefore, the wire 133 is in a stretched state, and the lid unit 90 is pulled up to the −B side. Then, the posture of the lid unit 90 becomes the closed posture (see FIG. 22).

As described above, in the printer 130, since a drive source for rotating the lid unit 90 may not be separately provided, and an installation space for the drive source may not be secured, it is possible to suppress an increase in size of the printer 130.

Next, a printer 140 according to Embodiment 4 as an example of the recording apparatus according to the present disclosure will be described. Note that portions common to the printer 1 (see FIG. 1) are denoted by the same reference signs, and description thereof will be omitted. Further, description of functions and effects similar to those in Embodiments 1, 2, and 3 will be omitted.

Figure 30:
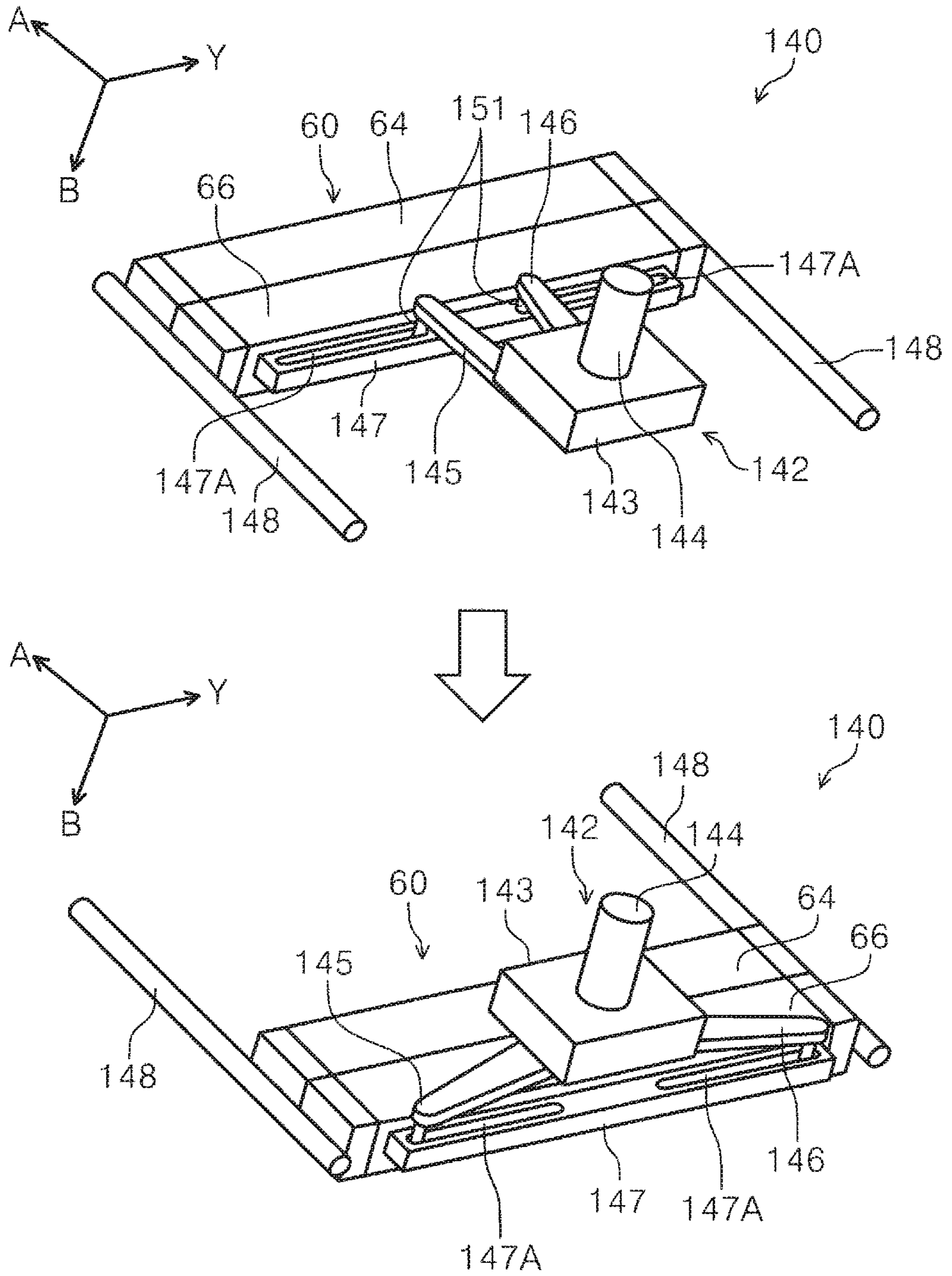
FIG. 30 is a perspective view illustrating a moving mechanism portion of a cap unit of a printer according to Embodiment 4.

As illustrated in the upper and lower diagrams of FIG. 30, the printer 140 is provided with a drive unit 142 instead of the drive unit 80 (see FIG. 10).

The drive unit 142 is an example of the drive portion that advances or retreats the maintenance unit 60 in the A direction. Specifically, the drive unit 142 includes a main body portion 143, a drive motor 144, arm portions 145 and 146, and a portion to be driven 147. Note that the maintenance unit 60 is supported by one pair of guide shafts 148 so as to be movable in the A direction.

A pinion and a gear (not illustrated) are provided in the main body portion 143. The pinion and the gear (not illustrated) are rotated by the drive motor 144 with the B direction serving as an axial direction.

The arm portion 145 and the arm portion 146 extend in the +A direction from the main body portion 143. Further, each of the arm portion 145 and the arm portion 146 is provided in the main body portion 143 so as to be rotatable with the B direction serving as the axial direction. Further, the arm portion 145 and the arm portion 146 are configured so as to be rotated in a direction approaching each other or in a direction being separated from each other by rotation of the pinion and the gear (not illustrated). A pin 151 is formed toward the +B direction at each of a free end of the arm portion 145 and a free end of the arm portion 146.

The portion to be driven 147 is formed at an end portion of the maintenance unit 60 in the −A direction. Specifically, the portion to be driven 147 is formed in a rectangular column shape elongated in the Y direction. Further, two groove portions 147A are formed in the portion to be driven 147 at an interval in the Y direction. The two groove portions 147A are opened toward the −B direction. Further, the two groove portions 147A extend in the Y direction. One pin 151 is inserted into each of the two groove portions 147A. As described above, the drive unit 142 is configured as a link mechanism portion. The drive control of the drive unit 142 is performed by the controller 26 (see FIG. 1).

As illustrated in the upper diagram of FIG. 30, when the arm portion 145 and the arm portion 146 are rotated in the direction approaching each other, the maintenance unit 60 is advanced in the +A direction.

As illustrated in the lower diagram of FIG. 30, when the arm portion 145 and the arm portion 146 are rotated in the direction being separated from each other, the maintenance unit 60 is retreated in the −A direction.

As described above, by performing the advancing and retreating movement of the maintenance unit 60 by using the drive unit 142 as the link mechanism unit, it is not necessary to form a rack long in the A direction in the maintenance unit 60.

Next, a printer 150 according to Embodiment 5 as an example of the recording apparatus according to the present disclosure will be described. Note that portions common to the printer 1 (see FIG. 1) are denoted by the same reference signs, and description thereof will be omitted. Further, description of functions and effects similar to those in Embodiments 1, 2, 3, and 4 will be omitted.

Figure 31:
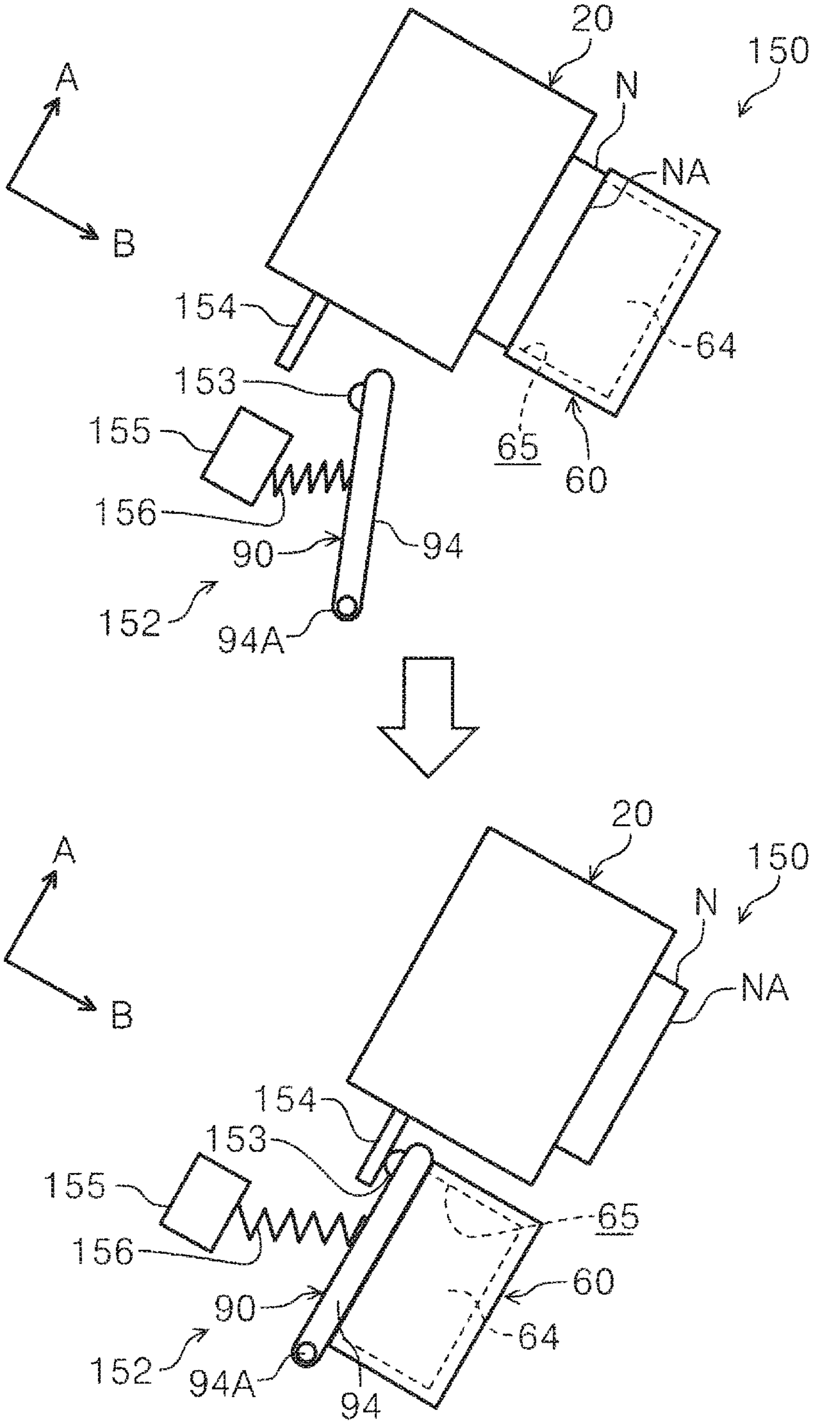
FIG. 31 is a perspective view illustrating a rotation mechanism portion of a lid unit of a printer according to Embodiment 5.

As illustrated in FIG. 31, the printer 150 is provided with a rotation mechanism portion 152 instead of the rotation mechanism portion 100 (see FIG. 13). The rotation mechanism portion 152 includes a convex portion 153, a plate portion 154, a bracket 155, and a tension spring 156.

The convex portion 153 is formed on the side plate 94, and protrudes from the side plate 94 in the −B direction.

The plate portion 154 is protruded in the −A direction from the side surface in the −A direction of the line head 20, and is disposed with the B direction serving as the thickness direction. Note that the convex portion 153 is located in a moving region of the plate portion 154.

The bracket 155 is attached to a main body frame (not illustrated) so as to face the lid unit 90 in the B direction.

The tension spring 156 couples the side plate 94 and the bracket 155. In a state where a length of the tension spring 156 is a natural length, a free end portion of the lid unit 90 is pulled up so as to be located more in the −B direction than the support shaft portion 94A.

Here, the lid unit 90 is disposed upstream of the line head 20 in the A direction. The maintenance unit 60 of Embodiment 5 has the standby position upstream of the line head 20 in the A direction. Further, the maintenance unit 60 has only the cap portion 64. Then, the maintenance unit 60 moves between the standby position and the cap position at which the cap portion 64 covers the nozzles N.

As illustrated in FIG. 31, in the printer 150, when the maintenance unit 60 is moved upstream in the A direction of the line head 20 from the storage state in which the cap portion 64 covers the nozzles N, the lid unit 90 closes the opening 65 of the maintenance unit 60.

Specifically, when the line head 20 moves to the recording position in the state where the maintenance unit 60 is moved to the retreat position in the −A direction, the plate portion 154 presses the convex portion 153 in the +B direction. Accordingly, the lid unit 90 closes the opening 65 of the maintenance unit 60.

As described above, even when the maintenance unit 60 is configured so as to have only the cap portion 64, the opening 65 can be closed by the lid unit 90.

Next, a printer 160 according to Embodiment 6 as an example of the recording apparatus according to the present disclosure will be described. Note that portions common to the printer 1 (see FIG. 1) are denoted by the same reference signs, and description thereof will be omitted. Further, description of functions and effects similar to those of Embodiments 1, 2, 3, 4, and 5 will be omitted.

Figure 32:
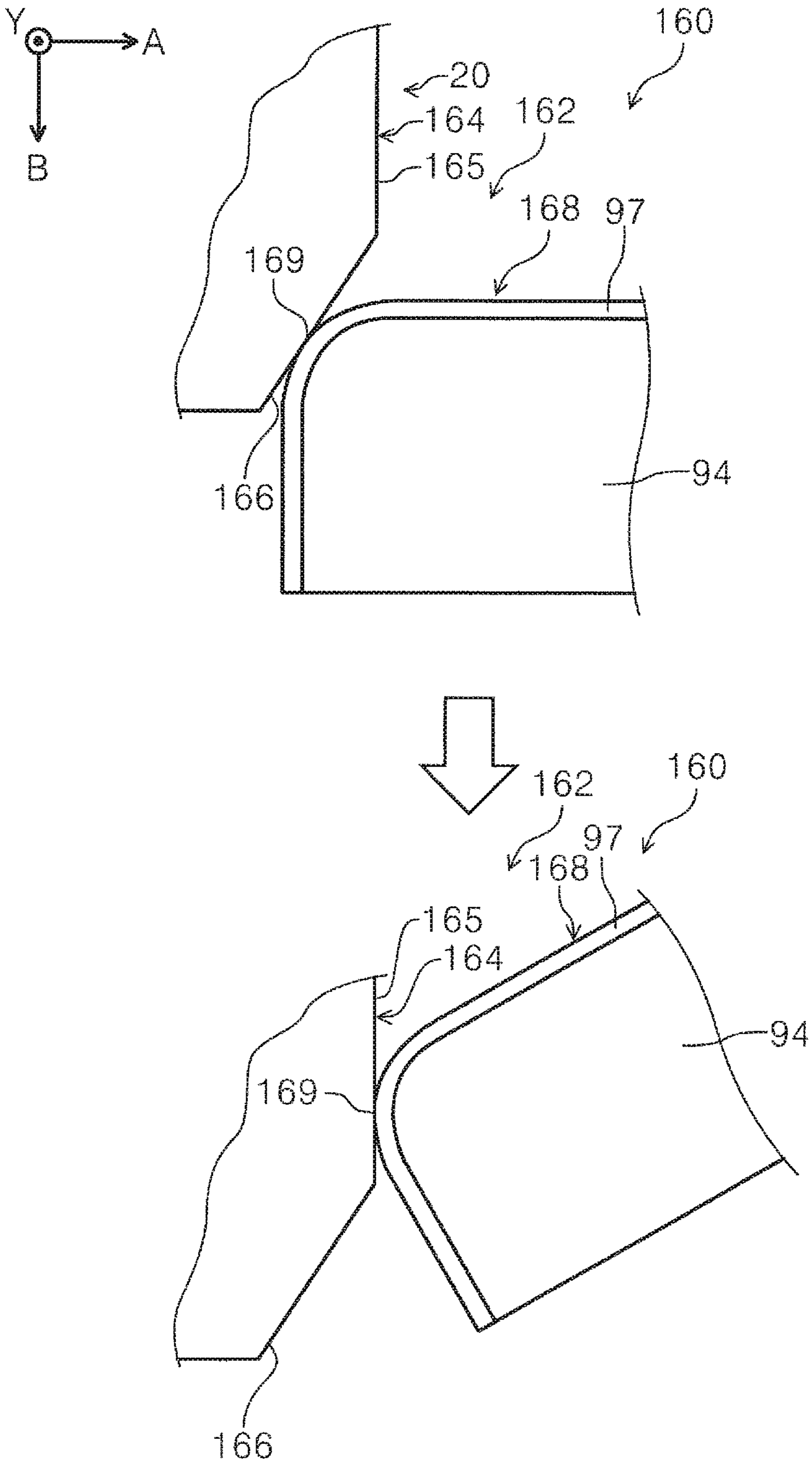
FIG. 32 is a diagram illustrating a state in which a lid unit according to Embodiment 6 slides.

As illustrated in FIG. 32, the printer 160 is provided with a rotation mechanism portion 162 instead of the rotation mechanism portion 100 (see FIG. 13).

The rotation mechanism portion 162 has a portion to be contacted 164 provided in the line head 20 and a contact portion 168 provided in the lid unit 90.

The portion to be contacted 164 has a sliding surface 165 as an example of the surface to be contacted, and a guide surface 166 that is formed in a portion closer to the transport unit 10 (see FIG. 1) with respect to the sliding surface 165 in the B direction and that guides the contact portion 168 to the sliding surface 165. When viewed from the Y direction, the guide surface 166 extends in a direction intersecting both the A direction and the B direction.

The contact portion 168 is brought into contact with the portion to be contacted 164 along with the movement of the line head 20 to the recording position, and rotates the lid unit 90. Further, the contact portion 168 has a curved surface 169 that contacts the guide surface 166 and the sliding surface 165. The curved surface 169 is formed in a circular arc shape when viewed from the Y direction.

As illustrated in FIG. 32, the contact portion 168 is brought into contact with the guide surface 166 and is guided to the sliding surface 165, so that it can be suppressed that the contact portion 168 is caught on the portion to be contacted 164.

The printers 1, 110, 130, 140, 150, and 160 according to Embodiments 1, 2, 3, 4, 5, and 6 of the present disclosure basically have the above-described configuration, but it is needless to say that modifications, omissions of partial configurations, and the like can also be made without departing from the spirit and scope of the present disclosure.

In the printer 1, the adjustment unit 46 may not be provided.

The B direction may be a direction inclined such that an end portion of the discharge tray 21 far from the transport unit 10 is located below an end portion close to the transport unit 10 in the Z direction.

The first angle θ1 may be equal to or smaller than the second angle θ2 in magnitude.

The printer 1 may not include the maintenance unit 60. In addition, the printer 1 may not include the second maintenance unit 72. Further, the printer 1 may be configured to attach and detach the line head 20 in the Y direction. Further, the flushing portion 66 may be disposed upstream of the cap portion 64 in the A direction.

The head moving unit 30 may not cause the line head 20 to be located at the standby position before causing the line head 20 to be located at any one of the first position, the second position, and the third position.

Only one of the surface to be contacted 103 and the guide surface 104 may be provided.

The transport path T of the medium P in the region in which the line head 20 and the transport unit 10 face each other is not limited to the path in the A direction, and may be a path in the horizontal direction.

What is claimed is:

1. A recording apparatus comprising:

a support portion configured to support a medium during transport;

a recording portion positioned to face the support portion and configured to perform recording on the medium;

a moving mechanism portion configured to move the recording portion toward and away from the support portion;

one or more recording positions a long a moving direction at which the recording portion is configured to perform on the medium; and an adjustment portion configured to adjust a location of the recording portion to the one or more recording positions, wherein the moving mechanism portion moves the recording portion in a moving direction intersecting both a horizontal direction and a vertical direction, and wherein the adjustment portion includes an eccentric cam configured to contact the recording portion and a motor configured to rotate the eccentric cam to adjust the location of the recording portion to each of the one or more recording positions.

2. The recording apparatus according to claim 1, wherein a transport direction of the medium in a region that includes the support portion and at which recording is performed by the recording portion is an inclined direction intersecting both the horizontal direction and the vertical direction; and the moving mechanism is configured to move the recording portion in the moving direction to one or more retreat positions and to one or more recording positions.

3. The recording apparatus according to claim 2, wherein the moving direction is a direction orthogonal to the transport direction.

4. The recording apparatus according to claim 2, wherein the moving mechanism portion is configured to stop the recording portion at the one or more recording positions and at the one or more retreat positions in the moving direction, and the recording portion performs recording on the medium at the one or more recording positions, and the recording portion does not perform recording on the medium at the one or more retreat positions.

5. The recording apparatus according to claim 4, further comprising:

at least one maintenance unit configured to perform maintenance of the recording portion, wherein the one or more retreat positions include a position at which the maintenance is performed by the maintenance unit and a standby position at which the maintenance is not performed by the maintenance unit.

6. The recording apparatus according to claim 5, wherein the maintenance unit moves so as to advance to a position between the recording portion and the support portion, and completes movement to the position when the recording portion is standing by at the standby position.

7. The recording apparatus according to claim 5, wherein the maintenance unit includes a first maintenance unit including a cap portion configured to cover an ejecting portion of the recording portion, and a second maintenance unit including a cleaning portion configured to clean the ejecting portion, the one or more retreat positions includes a first position at which the cap portion is configured to cover the ejecting portion and a third position at which the cleaning portion is configured to clean the ejecting portion, and the first position is closer to the support portion in the moving direction than the third position.

8. The recording apparatus according to claim 4, wherein a mounting member on which the medium discharged from a transport path is mounted is provided downstream of the support portion in the transport path of the medium and on an upper side in the vertical direction with respect to the one or more retreat positions.

9. The recording apparatus according to claim 1, further comprising one or more retreat positions, wherein the eccentric cam does not contact the recording portion when the recording portion is located at the one or more retreat positions.

10. The recording apparatus according to claim 1, wherein a mounting member on which the medium discharged from a transport path is mounted is provided downstream of the support portion in the transport path of the medium and on an upper side with respect to the recording portion in the vertical direction, a mounting surface of the mounting member on which the medium is mounted has an inclination obliquely upward along a medium discharge direction, and the moving direction is directed obliquely upward along a direction in which the recording portion is away from the support portion.

11. The recording apparatus according to claim 10, wherein a first angle formed between the moving direction and the horizontal direction is larger than a second angle formed between an inclination direction of the mounting surface and the horizontal direction.

12. The recording apparatus according to claim 1, further comprising:

at least one maintenance unit configured to perform maintenance of the recording portion, wherein the maintenance unit is advanced to a position between the recording portion and the support portion when the recording portion is located at a retreat position, and the maintenance unit is removed from the position between the recording portion and the support portion before the recording portion is moved to a recording position from the retreat position.

13. The recording apparatus according to claim 12, wherein the recording portion is configured to eject liquid from an ejecting portion to perform recording on the medium, and the maintenance unit includes:

a first maintenance unit including a cap portion configured to cover the ejecting portion and a receiving portion configured to cover the ejecting portion and configured to receive the liquid ejected from the ejecting portion, and a second maintenance unit including a cleaning portion configured to clean the ejecting portion, and wherein the moving mechanism is configured to move the recording portion in the moving direction to one or more retreat positions and to one or more recording positions, and the one or more retreat positions of the recording portion include a first position at which the cap portion is configured to cover the ejecting portion, a second position at which the receiving portion is configured to cover the ejecting portion, and a third position at which the cleaning portion is configured to clean the ejecting portion.

14. The recording apparatus according to claim 13, wherein before causing the recording portion to be located at any one of the first position, the second position, and the third position, the moving mechanism portion causes the recording portion to be located at a standby position away from the support portion.

15. The recording apparatus according to claim 1, wherein the moving mechanism is configured to move the recording portion in the moving direction to one or more retreat positions and to one or more recording positions, and the one or more retreat positions of the recording portion include a replacement position farthest from the support portion, and the recording portion is detachable from the moving mechanism portion at the replacement position.

16. The recording apparatus according to claim 15, wherein the moving mechanism portion includes a guide rail configured to guide the recording portion to the one or more recording positions, the one or more retreat positions, and the replacement position.

17. The recording apparatus according to claim 16, wherein a mounting member on which the medium discharged from a transport path is mounted is provided downstream of the support portion in the transport path of the medium and on an upper side in the vertical direction with respect to the replacement position.

18. A recording apparatus comprising:

a support portion configured to support medium during transport;

a recording portion positioned to face the support portion and configured to perform recording on the medium;

a moving mechanism portion configured to move the recording portion toward and away from the support portion;

an eccentric cam configured to contact the recording portion located at the recording position; and a motor configured to rotate the eccentric cam to adjust a location of the recording portion to each of one or more recording positions, wherein the moving mechanism portion moves the recording portion in a moving direction intersecting both a horizontal direction and a vertical direction, the moving mechanism is configured to move the recording portion in the moving direction to one or more retreat positions and to the one or more recording positions, and the one or more retreat positions of the recording portion include a replacement position farthest from the support portion, and the recording portion is detachable from the moving mechanism portion at the replacement position, the moving mechanism portion includes a guide rail configured to guide the recording portion to the one or more recording positions, the one or more retreat positions, and the replacement position, a mounting member on which the medium discharged from a transport path is mounted is provided downstream of the support portion in the transport path of the medium and on an upper side in the vertical direction with respect to the replacement position, and the eccentric cam does not contact the recording portion when the recording portion is located at the one or more retreat positions.

* * * * *